(12) United States Patent
Erickson et al.

(10) Patent No.: US 9,096,324 B2
(45) Date of Patent: Aug. 4, 2015

(54) JOINT ASSEMBLY TO FORM A SEALED FLOW CONDUIT

(71) Applicant: The Boeing Company, Chicago, IL (US)

(72) Inventors: Marcus Alexander Erickson, Snohomish, WA (US); Mahesh K. Chengalva, Kenmore, WA (US); Aaron Stephen Pahs, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 38 days.

(21) Appl. No.: 13/847,043

(22) Filed: Mar. 19, 2013

(65) Prior Publication Data

US 2014/0284426 A1    Sep. 25, 2014

(51) Int. Cl.
  *B64D 37/00* (2006.01)
  *B64C 1/06* (2006.01)
  *B64C 1/26* (2006.01)
  *B64C 3/34* (2006.01)

(52) U.S. Cl.
  CPC ............... *B64D 37/005* (2013.01); *B64C 1/06* (2013.01); *B64C 1/26* (2013.01); *B64C 3/34* (2013.01); *Y02T 50/44* (2013.01)

(58) Field of Classification Search
  CPC ........ B64D 37/00; B64D 37/04; B64D 37/06; B64D 37/08; B64C 1/068; B64C 1/06; B64C 1/061; B64C 1/064; B64C 1/065
  USPC ................ 244/119, 123.7, 123.8, 123.9, 131, 244/135 R
  See application file for complete search history.

(56) References Cited

U.S. PATENT DOCUMENTS

| 4,108,328 | A | | 8/1978 | Page |
| 4,189,059 | A | | 2/1980 | Shaw |
| 4,556,592 | A | * | 12/1985 | Bannink, Jr. .................... 428/43 |
| 4,715,417 | A | | 12/1987 | Coloney |
| 8,167,245 | B1 | | 5/2012 | Koehler et al. |
| 2004/0079838 | A1 | * | 4/2004 | Simpson et al. .............. 244/123 |
| 2005/0003145 | A1 | * | 1/2005 | Toi et al. ....................... 428/102 |
| 2007/0051851 | A1 | * | 3/2007 | Ruffin et al. .................. 244/131 |
| 2008/0067289 | A1 | * | 3/2008 | Meyer ........................... 244/131 |
| 2010/0304094 | A1 | * | 12/2010 | Brook et al. .................. 428/174 |
| 2010/0320325 | A1 | | 12/2010 | Parikh et al. |
| 2011/0027526 | A1 | * | 2/2011 | McCarville et al. ......... 428/116 |
| 2012/0049000 | A1 | | 3/2012 | Kajita et al. |
| 2012/0187246 | A1 | * | 7/2012 | Motohashi et al. ........ 244/123.1 |

FOREIGN PATENT DOCUMENTS

| EP | 2256031 A2 | 12/2010 |
| EP | 2502824 A2 | 9/2012 |

OTHER PUBLICATIONS

Extended European Search Report, dated Dec. 8, 2014, regarding Application No. EP14160048.6, 7 pages.

* cited by examiner

*Primary Examiner* — Tien Dinh
*Assistant Examiner* — Christopher Hutchens
(74) *Attorney, Agent, or Firm* — Yee & Associates, P.C.

(57) ABSTRACT

An apparatus comprising an elongated structure, a first plate, and a second plate. The elongated structure has a channel. The elongated structure is configured to be associated with a primary structure on a first side of the primary structure. The first plate is configured to be connected to the primary structure at a joint and cover a portion of the elongated structure. The first plate is connected to the primary structure on the first side of the primary structure. The second plate is configured to be connected to the primary structure on a second side of the primary structure.

20 Claims, 17 Drawing Sheets

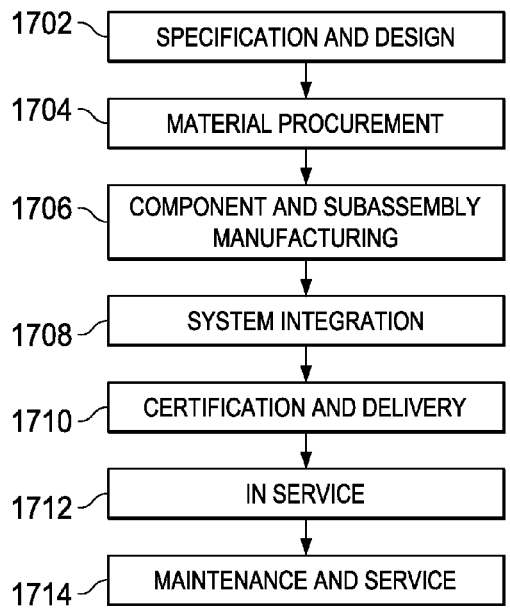
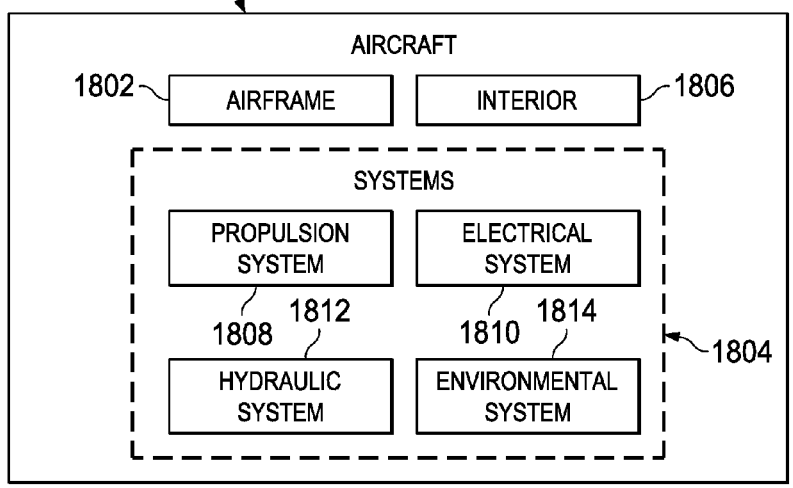

JOINT ASSEMBLY TO FORM A SEALED FLOW CONDUIT

BACKGROUND INFORMATION

1. Field

The present disclosure relates generally to joints and, in particular, to joints between structures. Still more particularly, the present disclosure relates to a method and apparatus for forming structural joints between composite structures to form sealed flow conduits.

2. Background

Aircraft are being designed and manufactured with ever increasing percentages of composite materials. Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Aircraft contain fuel tanks to provide fuel to a number of engines. In some aircraft, a number of the fuel tanks may be located in the wings. The aircraft fuel tanks may include a fuel vent system, also referred to as a vent system. This vent system regulates pressure within the fuel tanks.

The vent system may comprise discrete conduits only present for fuel venting. The vent system may comprise other structures modified to function as conduits for fuel venting. These structures also provide a primary functionality other than venting.

These structures may be composite structures. Currently no apparatus or method provides structural joining of composite structures while also providing a secondary functionality of the composite structures to form a sealed flow conduit for venting.

Therefore, it would be desirable to have a method and apparatus that takes into account at least some of the issues discussed above, as well as other possible issues.

SUMMARY

In one illustrative embodiment, an apparatus comprises an elongated structure, a first plate, and a second plate. The elongated structure has a channel. The elongated structure is configured to be associated with a primary structure on a first side of the primary structure. The first plate is configured to be connected to the primary structure at a joint and cover a portion of the elongated structure. The first plate is connected to the primary structure on the first side of the primary structure. The second plate is configured to be connected to the primary structure on a second side of the primary structure.

In another illustrative embodiment, an apparatus comprises a first elongated structure, a second elongated structure, and a joint assembly. The first elongated structure has a first channel. The first elongated structure is associated with a first primary structure. The second elongated structure has a second channel. The second elongated structure is associated with a second primary structure. The joint joins the first elongated structure and the second elongated structure. The joint assembly comprises a first plate, a second plate, and a third plate. The first plate is associated with the first primary structure, and covers a portion of the first elongated structure. The second plate associated with the first primary structure and the second primary structure. The third plate is associated with the second primary structure, and covers a portion of the second elongated structure. The first plate and the third plate are associated with a first structural member. The second plate is associated with a second structural member.

In yet another illustrative embodiment, a method is presented. An aircraft is operated. A load is carried during the operation of the aircraft with an apparatus comprising an elongated structure having a channel, wherein the elongated structure is configured to be associated with a primary structure on a first side of the primary structure; a first plate configured to be connected to the primary structure and cover a portion of the elongated structure, the first plate connected to the primary structure on the first side of the primary structure at a joint; and a second plate configured to be connected to the primary structure on a second side of the primary structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of an aircraft manufacturing and service method in the form of a block diagram in accordance with an illustrative embodiment; and FIG. 18 is an illustration of an aircraft in the form of a block diagram in which an illustrative embodiment may be implemented.

DETAILED DESCRIPTION

The different illustrative embodiments recognize and take into account one or more different considerations. For example, the illustrative embodiments recognize and take into account discrete fuel vent conduits may increase the weight of an aircraft. Accordingly, the illustrative embodiments recognize and take into account that using structural components, such as hat shaped stringers, as fuel vents may result in a weight savings.

The illustrative embodiments recognize and take into account that flow between two such structural components must be configured to allow a desired amount of flow from one side of a joint to another. The illustrative embodiments recognize and take into account that hydraulic diameter through the joint affects the amount of flow through the joint. Hydraulic diameter is a calculation used for flow in noncircular cross sections. Hydraulic diameter may be calculated by dividing four times the cross-sectional area by the wetted perimeter of the cross-section.

The illustrative embodiments also recognize and take into account that composite materials may transfer loads differently than metallic materials. Specifically, the illustrative embodiments recognize and take into account that composite materials may be weaker in the thickness direction of the composite. Accordingly, the illustrative embodiments recognize and take into account that out of plane loads may be undesirable in composite materials.

The illustrative embodiments also recognize and take into account design of a joint may decrease the assembly time of the joint. For example, ease of access to fasteners may decrease the time needed to install the fasteners. The illustrative embodiments also recognize and take into account design of a joint may allow visual access to parts allows for inspection during assembly.

Thus, the different illustrative embodiments provide an apparatus and method for forming structural joints between composite members to form sealed flow conduits. In particular, the different illustrative embodiments provide an apparatus for forming sealed flow conduits without increasing at least one of the weight, cost, and complexity of a platform more than desired.

Figure 1:
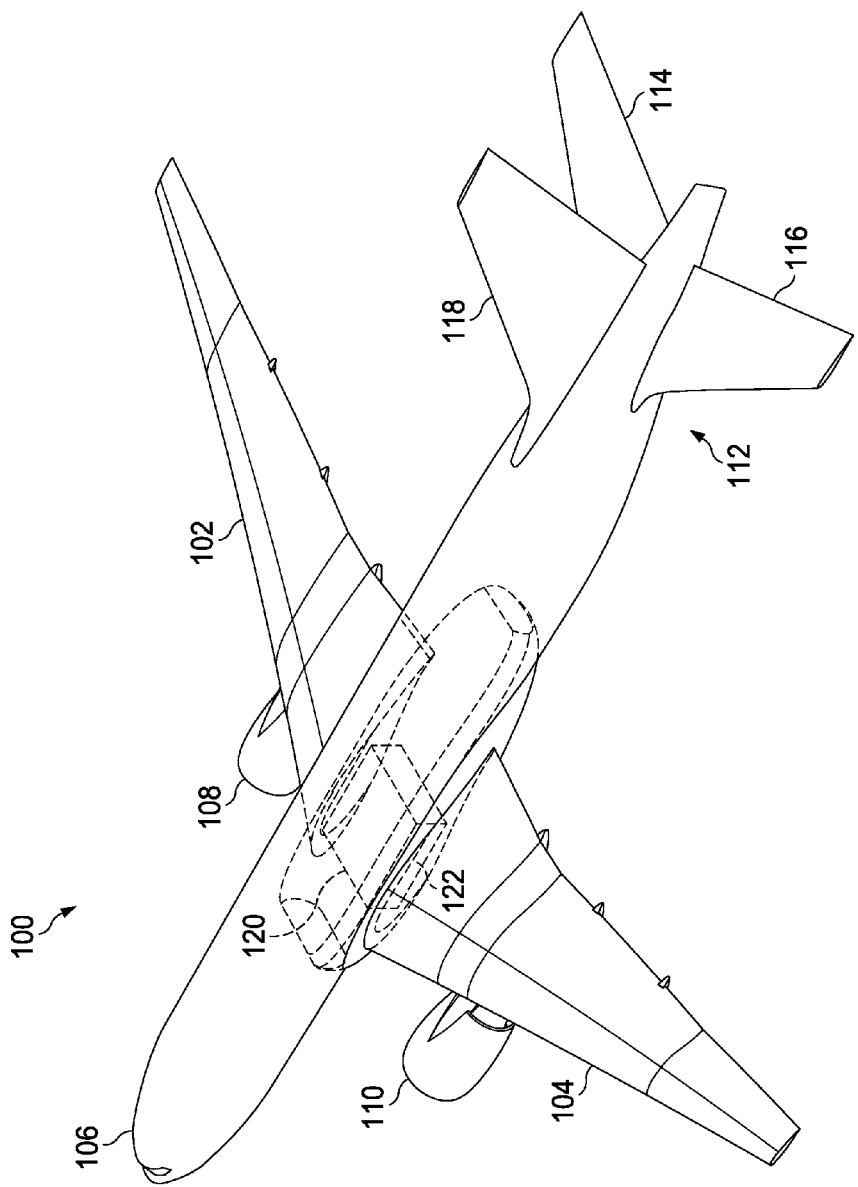
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a joint assembly may be implemented in accordance with an illustrative embodiment. For example, joint assembly 122 may be used in center wing box 120. One side of center wing box 120 connects wing 104 and body 106. The other side of center wing box 120 connects wing 102 and body 106. Joint assembly 122 may also be used on either side of center wing box 120. Further, joint assembly 122 may be used in other locations within aircraft 100 to provide structural joints between composite members which form sealed flow conduits.

Figure 2:
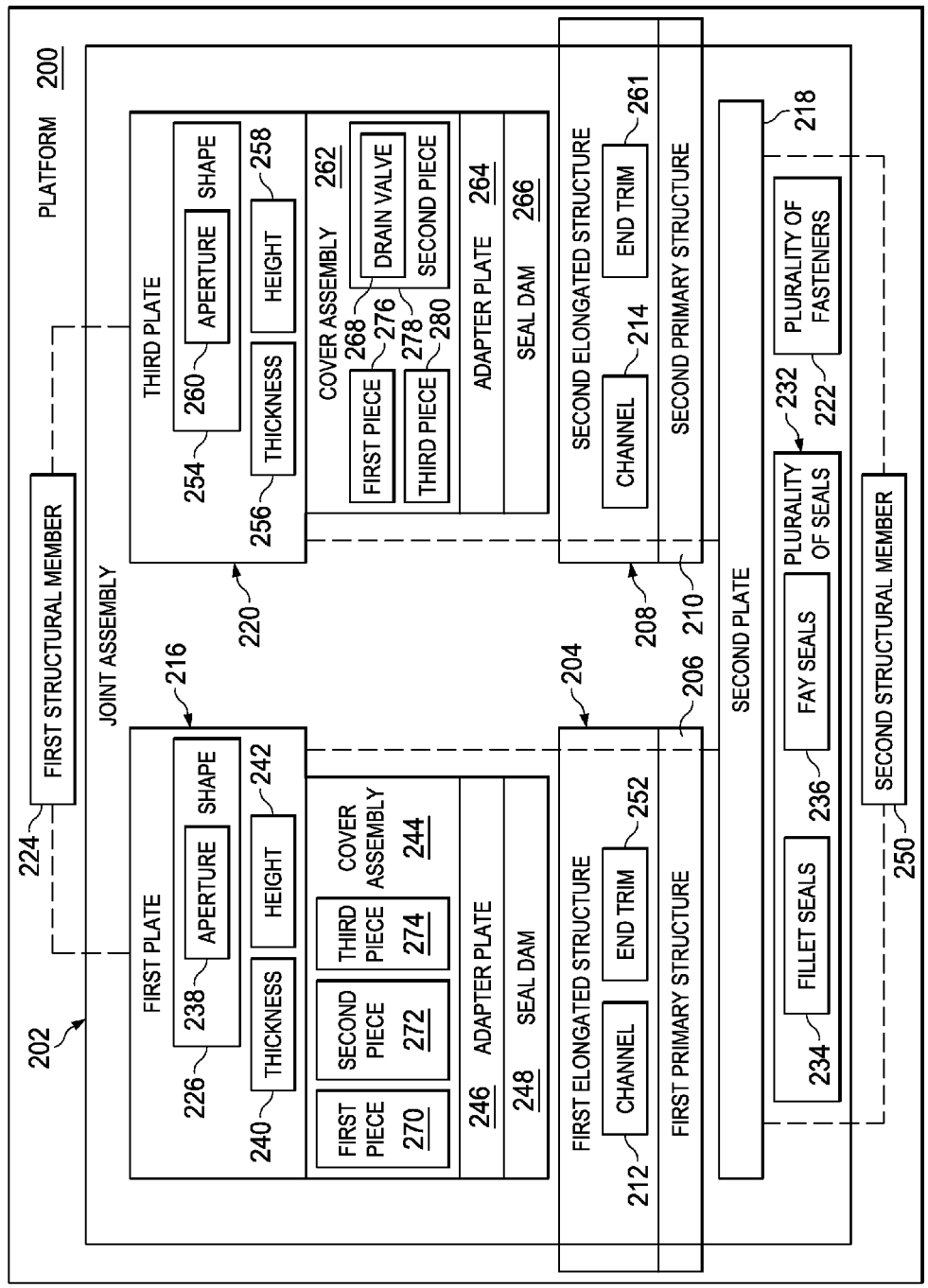
FIG. 2 is an illustration of a block diagram of a joint assembly in a platform in accordance with an illustrative embodiment.

With reference now to FIG. 2, an illustration of a block diagram of a joint assembly in a platform is depicted in accordance with an illustrative embodiment. Aircraft 100 of FIG. 1 is an example of one physical implementation of platform 200 of FIG. 2. Although the illustrative examples for an illustrative embodiment are described with respect to an aircraft, an illustrative embodiment may be applied to other types of platforms. Platform 200 may be, for example, without limitation, a mobile platform, a stationary platform, a land-based structure, an aquatic-based structure, and a space-based structure. More specifically, platform 200 may be a surface ship, a tank, a personnel carrier, a train, a spacecraft, a submarine, an automobile, a power plant, a bridge, a dam, a house, a manufacturing facility, a building, and other suitable platforms.

As depicted platform 200 has joint assembly 202. Joint assembly 202 connects first elongated structure 204 and first primary structure 206 to second elongated structure 208 and second primary structure 210.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As depicted first elongated structure 204 is associated with first primary structure 206. Second elongated structure 208 is associated with second primary structure 210.

When one component is "associated" with another component, the association is a physical association in the depicted examples. For example, a first component, first elongated structure 204, may be considered to be associated with a second component, first primary structure 206, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

First elongated structure 204 has channel 212. First elongated structure 204 and first primary structure 206 are associated such that channel 212 is covered by first primary structure 206, forming a conduit. Second elongated structure 208 has channel 214. Second elongated structure 208 and second primary structure 210 are associated such that channel 214 is covered by second primary structure 210, forming a conduit.

In one illustrative example, first primary structure 206 is a wing skin and first elongated structure 204 is a stringer. In this illustrative example, first elongated structure 204 may be selected from a variety of stringer shapes. For example, first elongated structure 204 may have a square shape, a hat shape, a rounded hat shape, an omega shape, or suitable other shape.

In some illustrative examples, first primary structure 206, second primary structure 210, first elongated structure 204, and second elongated structure 208 may be formed of a metal such as aluminum, titanium, aluminum alloys, titanium alloys, or other suitable metals. In some illustrative examples first primary structure 206, second primary structure 210, first elongated structure 204, and second elongated structure 208 may comprise composite material.

In some illustrative examples, first primary structure 206, second primary structure 210, first elongated structure 204, and second elongated structure 208 may be formed of the same material. In some illustrative examples, first primary structure 206, second primary structure 210, first elongated structure 204, and second elongated structure 208 may be formed of dissimilar materials.

In some illustrative examples, first primary structure 206 and first elongated structure 204 may be a composite material made from carbon-fiber reinforced plastic (CFRP). In one illustrative example, first primary structure 206 and first elongated structure 204 may be formed from thermoset composites. In this illustrative example, first primary structure 206 and first elongated structure 204 may be associated by curing at least one of first primary structure 206 and first elongated structure 204 while first primary structure 206 and first elongated structure 204 are positioned relative to each other. By curing at least one of first primary structure 206 and first elongated structure 204, first primary structure 206 and first elongated structure 204 may be bonded by the resin from at least one of first primary structure 206 and first elongated structure 204.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In another illustrative example, first primary structure 206 and first elongated structure 204 may be associated using adhesive. In these illustrative examples, the association between first primary structure 206 and first elongated structure 204 may create a fluid-tight seal. As a result, channel 212 of first elongated structure 204 may be used as a fluid conduit.

In one illustrative example, platform 200 may be an aircraft, such as aircraft 100 of FIG. 1. In this illustrative example, first elongated structure 204 and first primary structure 206 may be part of an aircraft wing, such as wing 104 of FIG. 1. In this illustrative example, second elongated structure 208 and second primary structure 210 may be connected to a fuselage of platform 200, such as body 106 of aircraft 100.

Joint assembly 202 provides a structural connection between first elongated structure 204, first primary structure 206, second elongated structure 208, and second primary structure 210. Specifically, joint assembly 202 creates a joint between first elongated structure 204 and first primary structure 206, and second elongated structure 208 and second primary structure 210. Joint assembly 202 also forms a sealed flow conduit using first elongated structure 204, first primary structure 206, second elongated structure 208, second primary structure 210, cover assembly 244, and cover assembly 262. In some illustrative examples, this sealed flow conduit comprises a fuel vent.

Components of joint assembly 202 may be made of any appropriate material. Materials may be selected from at least one of metals, composites, plastics, ceramics, or any other suitable material. Components of joint assembly 202 may be made of different materials.

Joint assembly 202 has first plate 216, second plate 218, and third plate 220. In some illustrative examples, first plate 216, second plate 218, and third plate 220 are configured to resist deformation under high loads and to transfer high loads. In one illustrative example, first plate 216, second plate 218, and third plate 220 are made from metal. In another illustrative example, at least one of first plate 216, second plate 218, and third plate 220 is made of titanium. First plate 216, second plate 218, and third plate 220 may be configured to carry a desired load for the joint.

First plate 216 is configured to transfer load from first elongated structure 204 and first primary structure 206 into joint assembly 202. First plate 216 is connected to first elongated structure 204, first primary structure 206, and second plate 218. First plate 216 may be connected to first elongated structure 204, first primary structure 206, and second plate 218 using fasteners from plurality of fasteners 222. Plurality of fasteners 222 may include fasteners having different shapes, materials, sizes, or other suitable characteristics. In one illustrative example, fasteners to connect first plate 216 are chosen from plurality of fasteners 222 based on the load transferred between first elongated structure 204 and first primary structure 206, and first plate 216.

In one illustrative example, first plate 216 may be connected to first elongated structure 204 using more than one size of fastener from plurality of fasteners 222. In one illustrative example, the size of fasteners used may change along the length of first elongated structure 204. In this illustrative example, fasteners used to connect first plate 216 to first elongated structure 204 which are closer to second elongated structure 208 may be larger than fasteners used to connect first plate 216 to first elongated structure 204 which are farther from second elongated structure 208. In this illustrative example, fastener size may be selected based on at least one suitable criteria including expected loads, type of fastener materials, fastener shape, type of load applied and other suitable criteria.

In one illustrative example, fastener size may be selected based on type of load. In this illustrative example, larger fasteners may be used for fasteners receiving double shear loads. A fastener in double shear has load applied in two planes. In this illustrative example, smaller fasteners may be used for fasteners receiving single shear loads. A fastener in single shear has load applied in one plane.

First plate 216 is also connected to first structural member 224. First plate 216 may transfer loads from first elongated structure 204 to first structural member 224.

First plate 216 has shape 226, thickness 240, and height 242. Shape 226 of first plate 216 is configured to cover a portion of first elongated structure 204. Shape of first plate 216 is also configured to achieve a desired stiffness. In one illustrative example, shape 226 of first plate 216 is configured to withstand expected loads on joint assembly 202 and to maintain structural integrity of first elongated structure 204.

As discussed further below, sealants from plurality of seals 232 may be applied between first elongated structure 204 and first plate 216 to create at least one seal of plurality of seals 232. One of these seals may be a fillet seal from fillet seals 234. Fillet seals 234 are seals applied after assembly at the juncture of two adjoining parts, or along the edges of mating surfaces. Fillet seals 234 may be formed from beads of sealant, sealant strips, elastomeric materials, or other suitable materials. Fay seals 236 are seals placed between two mating surfaces during assembly. Fay seals 236 may be formed by placing a layer of sealant between two mating surfaces. Fay seals 236 may be placed using rolling, spraying, scraping, or other suitable methods.

Shape 226 may be configured to allow installation of a fillet seal from fillet seals 234 between first elongated structure 204 and first plate 216. Shape 226 may also be configured to allow visual inspection of a fillet seal from fillet seals 234 between first elongated structure 204 and first plate 216.

Shape 226 may also be configured to provide a desired hydraulic diameter in joint assembly 202. In one illustrative example, shape 226 is configured to provide a desired hydraulic diameter in joint assembly 202 along the length of first elongated structure 204. In some illustrative examples, shape 226 may vary along the length of first elongated structure 204 to provide a desired hydraulic diameter for various positions along the length of first elongated structure 204.

Shape 226 has aperture 238. Aperture 238 may provide a desired hydraulic diameter for fluid flowing through first structural member 224 into or out of second elongated structure 208.

Thickness 240 of first plate 216 may vary along the length of first elongated structure 204. Thickness 240 of first plate 216 may increase along the length of first elongated structure 204 in a direction towards first structural member 224. Thickness 240 may be configured to receive loads gradually from first elongated structure 204. By thickness 240 increasing along the length of first elongated structure 204, the stiffness of first plate 216 also increases along the length of first elongated structure 204. The varying stiffness of first plate 216 may also allow first plate 216 to provide greater support to first elongated structure 204 and first primary structure 206 near first structural member 224, where greater loads may be concentrated in joint assembly.

In another illustrative example, varying stiffness of first plate 216 may prevent out of plane loads in first elongated structure 204. As used herein, "out of plane loads" refer to loads which are not in the plane of the object. For example, loads perpendicular to the surface of first elongated structure 204 are out of plane loads in first elongated structure 204.

Composite materials are anisotropic materials, meaning composite materials have material properties which are directionally dependent. As a result of their anisotropic nature, out of plane loads in composites may be undesirable.

Height 242 of first plate 216 also may vary along the length of first elongated structure 204. Height 242 of first plate 216 may be configured to provide a desired hydraulic diameter in joint assembly 202 along the length of first elongated structure 204. Height 242 of first plate 216 may also affect the stiffness of first plate 216.

Cover assembly 244, adapter plate 246, and seal dam 248 are associated with first plate 216. Cover assembly 244, adapter plate 246, seal dam 248, first plate 216, first elongated structure 204, and first primary structure 206 form a sealed conduit on one half of joint assembly 202.

Cover assembly 244 is configured to provide a flow path for fluid along first elongated structure 204 in joint assembly 202. In this illustrative example, cover assembly 244 comprises first piece 270, second piece 272, and third piece 274. First piece 270 of cover assembly 244 is associated with first plate 216 and second piece 272 of cover assembly 244. In some illustrative examples, a first number of fasteners from plurality of fasteners 222 may be used to connect first piece 270 of cover assembly 244 and first plate 216, while a second number of fasteners from plurality of fasteners 222 may be used to connect first piece 270 and second piece 272 of cover assembly 244. In some illustrative examples, the first number of fasteners from plurality of fasteners 222 may be installed in a direction approximately perpendicular to the direction of installation of the second number of fasteners from plurality of fasteners 222.

Second piece 272 of cover assembly 244 is associated with first plate 216, and first piece 270 and third piece 274 of cover assembly 244. In some illustrative examples, second piece 272 of cover assembly 244 may be connected to each of first plate 216, and first piece 270 and third piece 274 of cover assembly 244 with a corresponding number of fasteners. Third piece 274 of cover assembly 244 is associated with first plate 216, second piece 272 of cover assembly 244, adapter plate 246, and seal dam 248.

The material for cover assembly 244 may be selected based on at least one of expected loads, material cost, ease of manufacture, material reactivity, material weight, or any other suitable consideration. Cover assembly 244 may receive lower loads than first plate 216. In some illustrative examples, cover assembly 244 is not a significant contributor to joint load transfer. As a result, cover assembly 244 may be made from a material with different properties than a material of first plate 216.

In some illustrative examples, the material for each of first piece 270, second piece 272, and third piece 274 may be the same material. In some illustrative examples, the material for each of first piece 270, second piece 272, and third piece 274 may be different materials.

In some illustrative examples, first piece 270 may be formed of at least one of titanium, aluminum, polymer, composite, or other suitable materials. In one illustrative example, first piece 270 may be formed of extruded titanium.

In some illustrative examples, second piece 272 may be formed of at least one of fiberglass, polymer, aluminum, titanium, composite, or other suitable materials. In some illustrative examples, second piece 272 is designed to be a lower stiffness than first plate 216. In these illustrative examples, the material of second piece 272 may be selected to provide a lower stiffness than first plate 216. In one illustrative example, second piece 272 comprises fiberglass.

In some illustrative examples, third piece 274 may be formed of at least one of polymer, fiberglass, titanium, aluminum, or other suitable materials. In one illustrative example, third piece 274 comprises a superplastic formed titanium sheet.

In one illustrative example, like first plate 216, the height of cover assembly 244 may vary along first elongated structure 204. In this illustrative example, the height of cover assembly 244 may decrease in a direction towards first structural member 224.

Cover assembly 244 may be connected to first plate 216 using fasteners from plurality of fasteners 222. Fasteners used to connect cover assembly 244 to first plate 216 may be different than fasteners used to connect first plate 216 to first elongated structure 204. In one illustrative example, fasteners used to connect cover assembly 244 to first plate 216 are smaller than fasteners used to connect first plate 216 to first elongate composite member 204 as the intersection of cover assembly 244 and first plate 216 is subjected to smaller loads than the intersection of first plate 216 to first elongated structure 204.

Cover assembly 244 is configured to connect to first plate 216. The size and shape of cover assembly 244 may be determined based on at least shape 226 of first plate 216. The size and shape of cover assembly 244 may be configured to allow for installation and visual inspection of a fillet seal from fillet seals 234 between first elongated structure 204 and first plate 216 when cover assembly 244 is removed. Further, the size and shape of cover assembly 244 may be configured for ease of removal.

Adapter plate 246 and seal dam 248 are configured to seal first elongated structure 204 to cover assembly 244 and first plate 216. Adapter plate 246 is configured to be associated with first plate 216, cover assembly 244, and seal dam 248 to create a substantially fluid tight seal. The material of adapter plate 246 may be selected based on at least one of material flexibility, material reactivity, cost, weight, or other suitable characteristics. In some illustrative examples, adapter plate 246 is made from an injection molded plastic. In one illustrative example, adapter plate 246 is made from injection molded nylon.

Adapter plate 246 has features on a first side to mate with first plate 216. In one illustrative example, these features may be grooves configured to mate with flanges of first plate 216. Sealant from plurality of seals 232 may be applied to the first side of adapter plate 246 to create seals with first plate 216 and cover assembly 244. The sealant applied to the first side may create at least one of a fillet seal from fillet seals 234 and a fay seal from fay seals 236.

Adapter plate 246 is configured on a second side to create a seal with seal dam 248. Sealant applied to the second side may create at least one of a fillet seal from fillet seals 234 and a fay seal from fay seals 236. In one illustrative example, adapter plate 246 has a groove on the second side to receive a sealant. This sealant and groove may act similar to an o-ring to seal adapter plate 246 and seal dam 248. In another illustrative example, sealant may be rolled or otherwise applied to planar surfaces of the second side of adapter plate 246 to create a seal between adapter plate 246 and seal dam 248. In some illustrative examples, seal dam 248, adapter plate 246, and seals in plurality of seals 232, may be referred to as a sealing assembly.

Second plate 218 is configured to provide support in joint assembly 202 and prevent out of plane loads. Second plate 218 is connected to first elongated structure 204, first primary structure 206, first plate 216, second elongated structure 208, second primary structure 210, third plate 220, first structural member 224, and second structural member 250.

Second plate 218 is connected to first elongated structure 204, first primary structure 206, and first plate 216 using a first number of fasteners from plurality of fasteners 222. Fasteners in the first number of fasteners may be referred to as double shear fasteners. The first plane of load in the first number of fasteners may be at the intersection of second plate 218 and first primary structure 206. The second plane of load in the first number of fasteners may be at the intersection of first plate 216 and first elongated structure 204.

A second number of fasteners from plurality of fasteners 222 may connect second plate 218 to first primary structure 206. Cover assembly 244 and first plate 216 are configured to allow installation of the second number of fasteners.

Second plate 218 may be connected to first structural member 224 and second structural member 250 using a third number of fasteners from plurality of fasteners 222. First plate 216 and third plate 220 are configured to allow space for the third number of fasteners. In one illustrative example, a gap may be present between first plate 216 and first structural member 224 which provides sufficient space for fasteners in the third number of fasteners. Likewise, in this illustrative example, a gap may be present between third plate 220 and first structural member 224 which provides sufficient space for fasteners in the third number of fasteners. In one illustrative example, these gaps are filled with sealant.

First elongated structure 204 may be configured to influence loads. First elongated structure 204 has end trim 252. End trim 252 is the end of first elongated structure 204 near first structural member 224. In one illustrative example, end trim 252 has a shape configured to transfer loads within first elongated structure 204. In another illustrative example, end trim 252 has a shape configured to reduce interlaminar tension in first elongated structure 204. End trim 252 may be formed in first elongated structure 204 by at least one of cutting, composite lay-up, or any suitable fabrication method.

End trim 252 may have a shape with curved sections, straight sections, or a combination of curved and straight sections. In one illustrative example, end trim 252 may have a curved section with a continually varying radius. In another illustrative example, end trim 252 may have a curved section with a uniform radius.

In some illustrative examples, first elongated structure 204 is a hat shaped composite stringer with end trim 252. In these illustrative examples, end trim 252 may direct load from the cap of first elongated structure 204 downwards towards the base of first elongated structure 204. By directing load towards the base of first elongated structure 204, end trim 252 may direct load into first plate 216. By directing load away from the cap of first elongated structure 204, end trim 252 may prevent undesirable concentrations of load in the cap.

End trim 252 may also allow installation of fasteners. In one illustrative example, end trim 252 allows installation of fasteners joining second plate 218 and first elongated structure 204.

Third plate 220 is configured to transfer load from second elongated structure 208 and second primary structure 210 into joint assembly 202. Third plate 220 is connected to second elongated structure 208, second primary structure 210, and second plate 218. Third plate 220 may be connected to second elongated structure 208, second primary structure 210, and second plate 218 using fasteners from plurality of fasteners 222. In one illustrative example, fasteners to connect third plate 220 are chosen from plurality of fasteners 222 based on the load transferred between second elongated structure 208 and second primary structure 210, and third plate 220.

In one illustrative example, third plate 220 may be connected to second elongated structure 208 using more than one size of fastener from plurality of fasteners 222. In one illustrative example, the size of fasteners used may change along the length of second elongated structure 208. In this illustrative example, fasteners used to connect third plate 220 to second elongated structure 208 which are closer to first elongated structure 204 may be larger than fasteners used to connect third plate 220 to second elongated structure 208 which are farther from first elongated structure 204. In this illustrative example, fastener size may be selected based on at least one suitable criteria including expected loads, type of fastener materials, fastener shape, type of load applied and other suitable criteria.

In one illustrative example, fastener size may be selected based on type of load. In this illustrative example, larger fasteners may be used for fasteners receiving double shear loads. In this illustrative example, smaller fasteners may be used for fasteners receiving single shear loads.

In one illustrative example, fasteners used to connect third plate 220 to second elongated structure 208 may be the same sizes as fasteners used to connect first plate 216 to first elongated structure 204. Although the same sizes of fasteners may be used in both first plate 216 and third plate 220, a different number of fasteners may be used. Further, spacing between fasteners and placement of fasteners may be different in connecting first plate 216 to first elongated structure 204 when compared to connecting third plate 220 to second elongated structure 208.

Third plate 220 is also connected to first structural member 224. Third plate 220 may transfer loads from second elongated structure 208 to first structural member 224. Fasteners may be selected from plurality of fasteners 222 to carry the expected load. In one illustrative example, a number of fasteners from plurality of fasteners 222 go through first plate 216, first structural member 224, and third plate 220 to connect first plate 216, first structural member 224, and third plate 220.

Third plate 220 has shape 254, thickness 256, and height 258. Shape 254 of third plate 220 is configured to cover a portion of second elongated structure 208. Shape 254 of third plate 220 is also configured to achieve a desired stiffness. In one illustrative example, shape 254 of third plate 220 is configured to withstand expected loads on joint assembly 202 and to maintain structural integrity of second elongated structure 208.

Shape 254 may be configured to allow for installation of a fillet seal from fillet seals 234 between second elongated structure 208 and third plate 220. Shape 254 may also be configured to allow for visual inspection of a fillet seal from fillet seals 234 between second elongated structure 208 and third plate 220.

In some illustrative examples, joint assembly 202 is configured to meet a desired hydraulic diameter for the sealed flow conduit. Shape 254 may be configured to provide a desired hydraulic diameter in joint assembly 202. In one illustrative example, shape 254 is configured to provide a desired hydraulic diameter in joint assembly 202 along the length of second elongated structure 208. In some illustrative examples, shape 254 may vary along the length of second elongated structure 208 to provide a desired hydraulic diameter for various positions along the length of second elongated structure 208.

Shape 254 has aperture 260. Aperture 260 may provide a desired hydraulic diameter for fluid flowing through first structural member 224 into or out of first elongated structure 204.

Third plate 220 has similar functional considerations as first plate 216. As a result, in some illustrative examples, shape 254 of third plate 220 may be similar to shape 226 of first plate 216. In one illustrative example, shape 254 is the same as shape 226. In some illustrative examples, thickness 256 of third plate 220 may be similar to thickness 240 of first plate 216. In some illustrative examples, height 258 of third plate 220 may be similar to height 242 of first plate 216.

Second elongated structure 208 has end trim 261. End trim 261 is the end of second elongated structure 208 near first structural member 224. In one illustrative example, end trim 261 has a shape configured to transfer loads within second elongated structure 208. In another illustrative example, end trim 261 has a shape configured to reduce interlaminar tension in second elongated structure 208. End trim 261 may be formed in second elongated structure 208 by at least one of cutting, composite lay-up, or any suitable fabrication method.

End trim 261 may have a shape with curved sections, straight sections, or a combination of curved and straight sections. In one illustrative example, end trim 261 may have a curved section with a continually varying radius. In another illustrative example, end trim 261 may have a curved section with a uniform radius.

In some illustrative embodiments, end trim 261 of second elongated structure 208 may be the same shape as end trim 252 of first elongated structure 204. In other illustrative embodiments, end trim 261 of second elongated structure 208 may be different than end trim 252 of first elongated structure 204.

In some illustrative examples, second elongated structure 208 is a hat shaped composite stringer with end trim 261. In these illustrative examples, end trim 261 may direct load from the cap of second elongated structure 208 downwards towards the base of second elongated structure 208. By directing load towards the base of second elongated structure 208, end trim 261 may direct load into third plate 220. By directing load away from the cap of second elongated structure 208, end trim 261 may prevent undesirable concentrations of load in the cap.

End trim 261 may also allow installation of fasteners. In one illustrative example, end trim 261 allows installation of fasteners joining second plate 218 and second elongated structure 208.

Thickness 256 of third plate 220 may vary along the length of second elongated structure 208. Thickness 256 of third plate 220 may increase along the length of second elongated structure 208 in a direction towards first structural member 224. Thickness 256 may be configured to receive loads gradually from second elongated structure 208. By thickness 256 increasing along the length of second elongated structure 208, the stiffness of third plate 220 also increases along the length of second elongated structure 208. The varying stiffness of third plate 220 may also allow third plate 220 to provide greater support to second elongated structure 208 and second primary structure 210 near first structural member 224 where greater loads may be concentrated in joint assembly 202. In another illustrative example, varying stiffness of third plate 220 may prevent out of plane loads.

Likewise, height 258 of third plate 220 may vary along the length of second elongated structure 208. Height 258 of third plate 220 may be configured to provide a desired hydraulic diameter in joint assembly 202 along the length of second elongated structure 208. Height 258 of third plate 220 may also affect the stiffness of third plate 220.

Cover assembly 262, adapter plate 264, and seal dam 266 are associated with third plate 220. Cover assembly 262, adapter plate 264, seal dam 266, third plate 220, second elongated structure 208, and second primary structure 210 form a sealed conduit on one half of joint assembly 202.

Cover assembly 262 is configured to provide a flow path for fluid along second elongated structure 208 in joint assembly 202. In this illustrative example, cover assembly 262 comprises first piece 276, second piece 278, and third piece 280. First piece 276 of cover assembly 262 is associated with third plate 220 and second piece 278 of cover assembly 262. In some illustrative examples, a first number of fasteners from plurality of fasteners 222 may be used to connect first piece 276 of cover assembly 262 and third plate 220, while a second number of fasteners from plurality of fasteners 222 may be used to connect first piece 276 and second piece 278 of cover assembly 262. In some illustrative examples, the first number of fasteners may be installed in a direction approximately perpendicular to the direction of installation of the second number of fasteners.

Second piece 278 of cover assembly 262 is associated with third plate 220, and first piece 276 and third piece 276 of cover assembly 262. In some illustrative examples, second piece 278 of cover assembly 262 may be connected to each of third plate 220, and first piece 276 and third piece 280 of cover assembly 262 with a corresponding number of fasteners. Third piece 280 of cover assembly 262 is associated with third plate 220, second piece 278 of cover assembly 262, adapter plate 264, and seal dam 266.

The material for cover assembly 262 may be selected based on at least one of expected loads, material cost, ease of manufacture, material reactivity, material weight, or any other suitable consideration. Cover assembly 262 may receive lower loads than third plate 220. In some illustrative examples, cover assembly 262 is not a significant contributor to joint load transfer. As a result, cover assembly 262 may be made from a material with different properties than a material of third plate 220.

In some illustrative examples, the material for each of first piece 276, second piece 278, and third piece 280 may be the same material. In some illustrative examples, the material for each of first piece 276, second piece 278, and third piece 280 may be different materials. In some illustrative examples, first piece 276, second piece 278, and third piece 280 may be made of the same or similar materials listed above with reference to first piece 270, second piece 272, and third piece 274.

In one illustrative example, like third plate 220, the height of cover assembly 262 may vary along second elongated structure 208. In this illustrative example, the height of cover assembly 262 may decrease in a direction towards first structural member 224.

Cover assembly 262 may be connected to third plate 220 using fasteners from plurality of fasteners 222. Fasteners used to connect cover assembly 262 to third plate 220 may be different than fasteners used to connect third plate 220 to second elongated structure 208. In one illustrative example, fasteners used to connect cover assembly 262 to third plate 220 are smaller than fasteners used to connect third plate 220 to second elongate composite member 208 as the intersection of cover assembly 262 and third plate 220 is subjected to smaller loads than the intersection of third plate 220 to second elongated structure 208. In some illustrative examples, fasteners used to connect cover assembly 262 to third plate 220 may be smaller than fasteners used to connect cover assembly 244 to first plate 216.

Cover assembly 262 is configured to connect to third plate 220. The size and shape of cover assembly 262 may be determined based on at least shape 254 of third plate 220. The size and shape of cover assembly 262 may be configured to allow for installation and visual inspection of a fillet seal from fillet seals 234 between second elongated structure 208 and third plate 220 when cover assembly 262 is removed. Further, the size and shape of cover assembly 262 may be configured for ease of removal.

Cover assembly 262 has drain valve 268. In some illustrative examples, drain valve 268 is a one-way drain valve. In some illustrative examples, drain valve 268 may be present to allow accumulated liquid within joint assembly 202 to exit joint assembly 202.

In some illustrative examples, platform 200 is an aircraft, such as aircraft 100 of FIG. 1. In these illustrative examples, drain valve 268 may be located at a low point of joint assembly 202 when the platform 200 is at rest or in level flight.

It may be undesirable to have fuel within joint assembly 202 during operations of an aircraft, such as during flight. As a result, drain valve 268 may provide a path for accumulated liquid to escape from joint assembly 202.

In some illustrative examples, drain valve 268 may be a one-way valve. In other words, drain valve 268 may allow fuel to exit joint assembly 202 through drain valve 268; however, drain valve 268 may not allow fuel to enter joint assembly 202 through drain valve 268. In some illustrative examples, when a liquid level outside second elongated structure 208 drops below a drain level, fuel may exit joint assembly 202 through drain valve 268.

Adapter plate 264 and seal dam 266 are configured to seal second elongated structure 208 to cover assembly 262 and third plate 220. Adapter plate 264 is configured to be associated with third plate 220, cover assembly 262, and seal dam 266 to create a substantially fluid tight seal. In one illustrative example, adapter plate 264 and seal dam 266 are identical to adapter plate 246 and seal dam 248.

Adapter plate 264 has features on a first side to mate with third plate 220. In one illustrative example, these features may be grooves configured to mate with flanges of third plate 220. Sealant from plurality of seals 232 may be applied to the first side of adapter plate 264 to create seals with third plate 220 and cover assembly 262. The sealant applied to the first side may create at least one of a fillet seal from fillet seals 234 and a fay seal from fay seals 236.

Adapter plate 264 is configured on a second side to create a seal with seal dam 266. In one illustrative example, adapter plate 264 has a groove on the second side to receive a sealant. This sealant and groove may act similar to an o-ring to seal adapter plate 264 and seal dam 266. In another illustrative example, sealant may be rolled or otherwise applied to planar surfaces of the second side of adapter plate 264 to create a seal between adapter plate 264 and seal dam 266. Sealant applied to the second side may create at least one of a fillet seal from fillet seals 234 and a fay seal from fay seals 236. In some illustrative examples, seal dam 266, adapter plate 264, and seals in plurality of seals 232, may be referred to as a sealing assembly.

Joint assembly 202 may form a sealed flow conduit using plurality of seals 232. Plurality of seals 232 includes fillet seals 234 and fay seals 236. Sealant may be placed on any or all mating surfaces of components which contact fluid in joint assembly 202. In other words, a seal from plurality of seals 232 may be placed between each component of joint assembly 202 which contacts fluid. For example, a number of seals of plurality of seals 232 may be placed between first plate 216 and first elongated structure 204, between first plate 216 and first structural member 224, between cover assembly 244 and first plate 216, between cover assembly 244 and adapter plate 246, between first plate 216 and adapter plate 246, and between adapter plate 246 and seal dam 248. The type of seal may be determined based on the type of intersection between components and the desired functionality.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in one illustrative example, second structural member 250 may not be connected to second plate 218. In this illustrative example, second plate 218 may be thicker or made from a different material to provide additional support to joint assembly 202.

Figure 3:
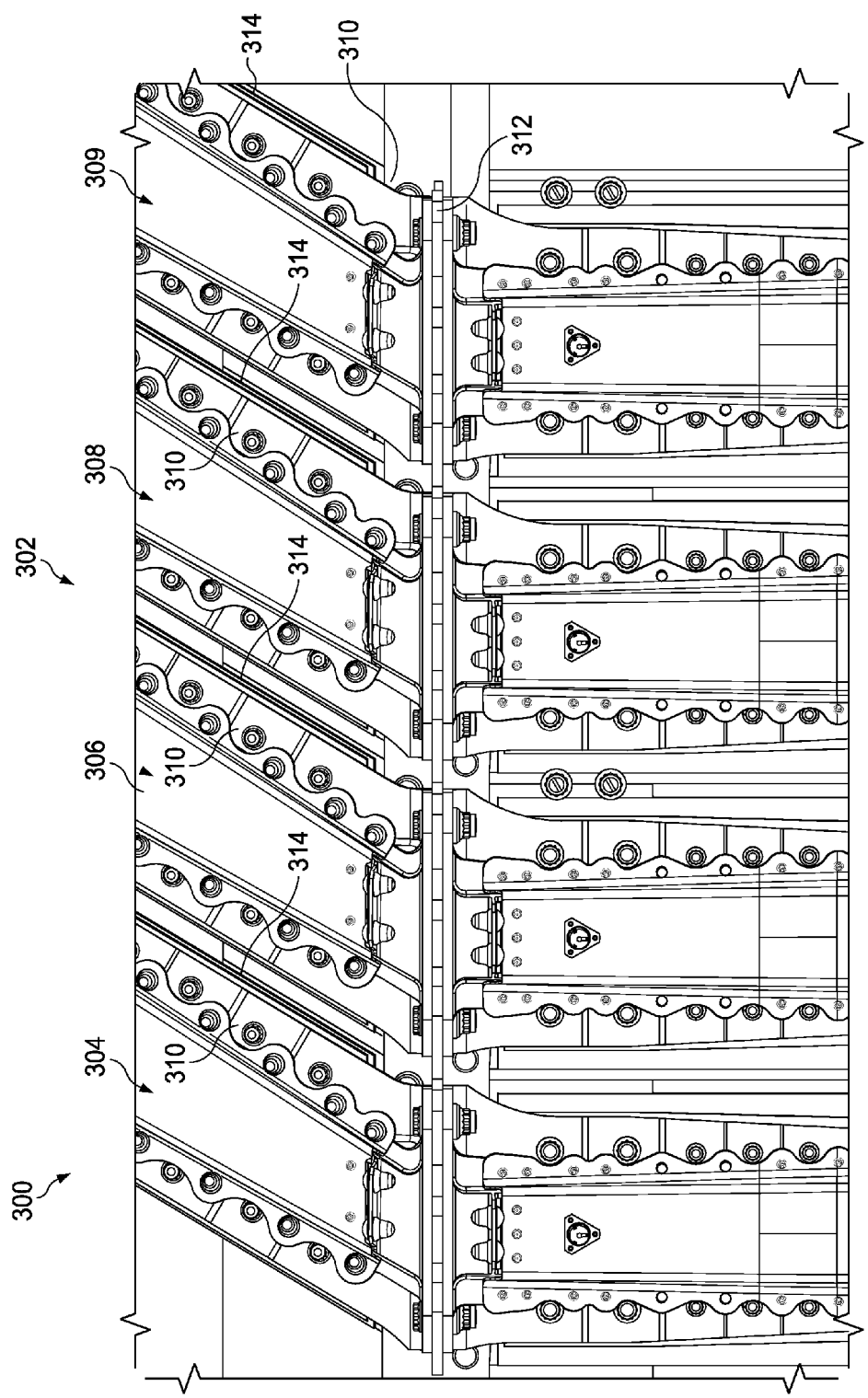
FIG. 3 is an illustration of a portion of a side of a center wing box in accordance with an illustrative embodiment.

With reference now to FIG. 3, an illustration of a portion of a side of a center wing box is depicted in accordance with an illustrative embodiment. In FIG. 3, center wing box 300 may be one implementation of a center wing box 120 of FIG. 1.

Center wing box 300 creates structural connections between a plurality of elongated structures using a plurality of joint assemblies 302. The plurality of joint assemblies 302 includes joint assembly 304, joint assembly 306, joint assembly 308, and joint assembly 309. Joint assembly 304, joint assembly 306, joint assembly 308, and joint assembly 309 may be physical implementations of joint assembly 202 shown in block form in FIG. 2. As depicted, joint assembly 304, joint assembly 306, joint assembly 308, and joint assembly 309 each create a structural connection and a sealed flow conduit for associated elongated structures.

As depicted, plurality of joint assemblies 302 connect to first structural member 310, second structural member 312, and plate 314. First structural member 310 and second structural member 312 provide structural support for an aircraft such as aircraft 100 of FIG. 1 and may be made of any suitable material. In one illustrative example, first structural member 310 is a part of the side of body web of an aircraft such as aircraft 100 of FIG. 1. In this illustrative example, first structural member 310 may be made of aluminum.

The illustration of center wing box 300 in FIG. 3 is not meant to imply physical or architectural limitations to the manner in which an illustrative embodiment may be implemented. Although center wing box 300 is depicted as having four flow conduit joint assemblies: joint assembly 304, joint assembly 306, joint assembly 308, and joint assembly 309, center wing box 300 may have any number of sealed flow conduit joint assemblies. The desired number of sealed flow conduit joint assemblies may be determined based on at least one of size of the elongated structures, shape of the elongated structures, flow requirements, desired speed of fueling, and other suitable considerations.

Further, in some illustrative examples, center wing box 300 may have additional conventional joint assemblies. These conventional joint assemblies may only provide a structural joint. In these illustrative examples the conventional joint assemblies do not provide a sealed flow conduit. Conventional joint assemblies may connect elongated structures having a square shape, a hat shape, a rounded hat shape, an omega shape, or suitable other shape. Yet further, in some illustrative examples, rather than single plate 314, center wing box 300 may include more than one plate.

Figure 4:
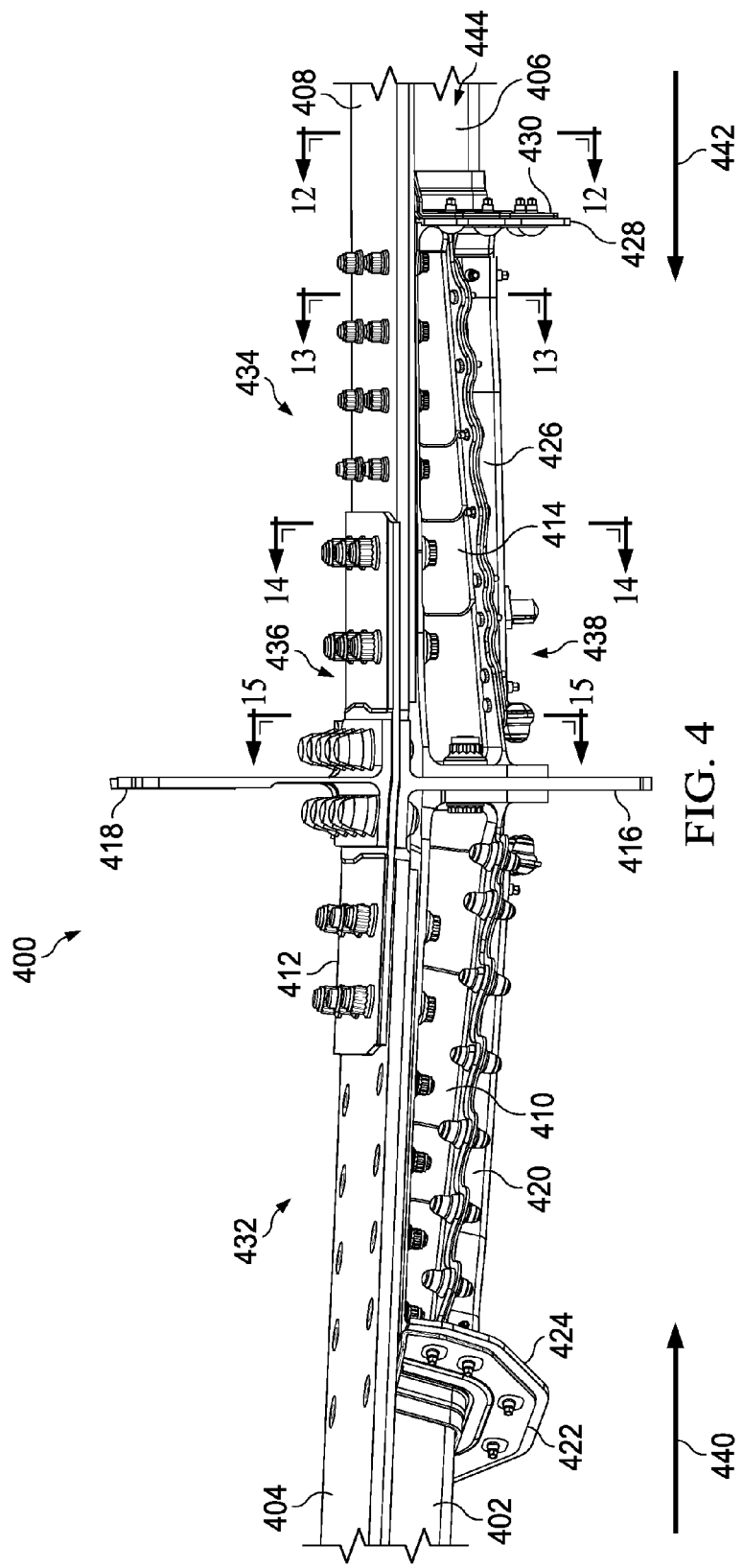
FIG. 4 is an illustration of a first view of a joint assembly in accordance with an illustrative embodiment.

With reference now to FIG. 4, an illustration of a first view of a joint assembly is depicted in accordance with an illustrative embodiment. As depicted, joint assembly 400 is an example of a physical implementation of joint assembly 202 shown in block form in FIG. 2. As depicted joint assembly 400 may be implemented in a center wing box like joint assembly 304 in center wing box 300 of FIG. 3.

Joint assembly 400 connects first elongated structure 402, first primary structure 404, second elongated structure 406, and second primary structure 408. First plate 410 is connected to first elongated structure 402, first primary structure 404, and second plate 412. Third plate 414 is connected to second elongated structure 406, second primary structure 408, and second plate 412. First plate 410 and third plate 414 are connected together, capturing first structural member 416 between them. First structural member 416 and second structural member 418 may attach to second plate 412.

Cover assembly 420, seal dam 422, and adapter plate 424 are connected to first plate 410. Cover assembly 426, adapter plate 428, and seal dam 430 are connected to third plate 414.

Joint assembly 400 has half 432 and half 434. Half 432 has first elongated structure 402, first primary structure 404, first plate 410, cover assembly 420, seal dam 422, and adapter plate 424. Half 434 has second elongated structure 406, second primary structure 408, third plate 414, cover assembly 426, adapter plate 428, and seal dam 430.

Joint assembly 400 may be implemented in a center wing box, such as center wing box 120 of FIG. 1. In one illustrative example, half 432 may be associated with a wing, such as wing 104 of aircraft 100. In this illustrative example, half 434 may be associated with body 106 of aircraft 100.

FIG. 4 is a first view of joint assembly 400. Joint assembly 400 may also be viewed from a number of other views including from side 436, side 438, direction 440, direction 442, and side 444.

Figure 5:
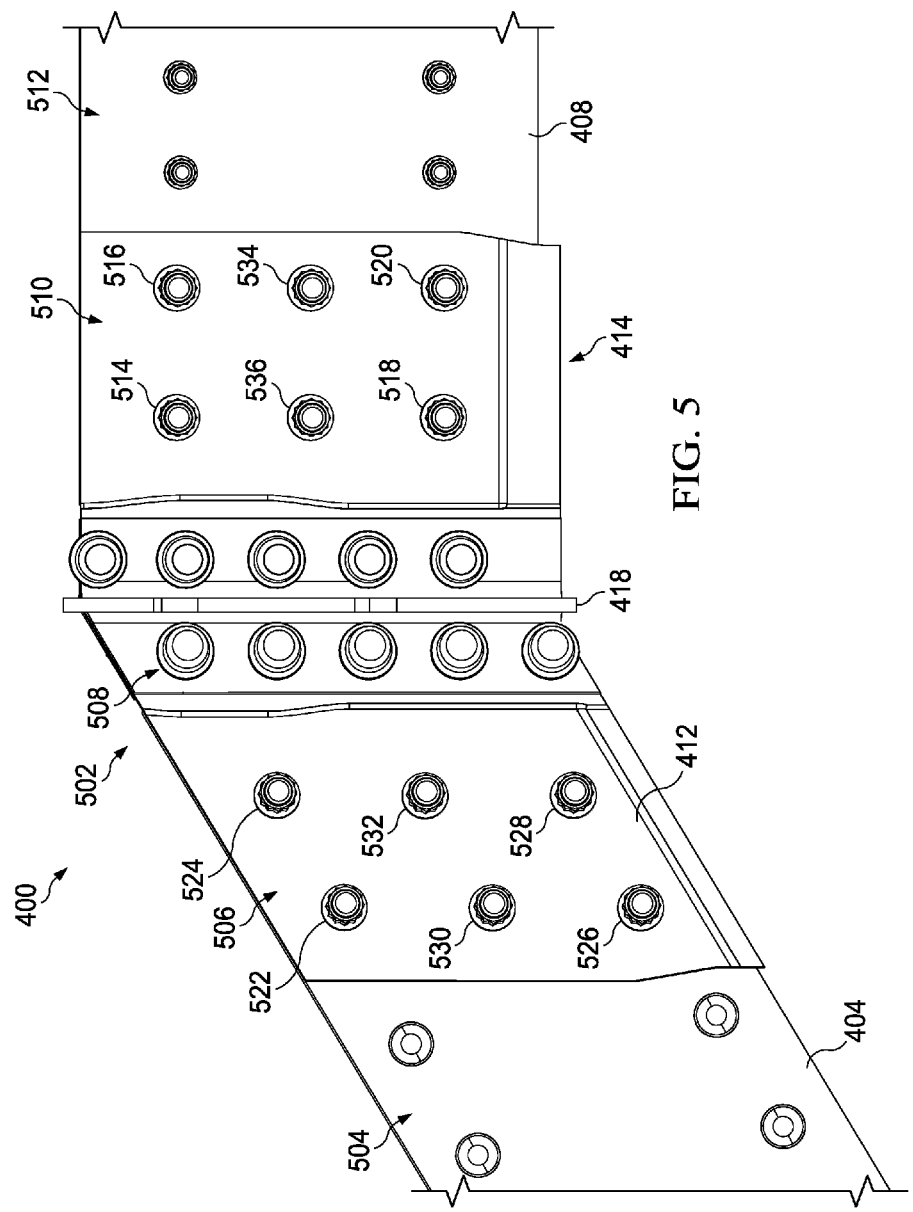
FIG. 5 is an illustration of a second view of a joint assembly in accordance with an illustrative embodiment.

With reference now to FIG. 5, an illustration of a second view of a joint assembly is depicted in accordance with an illustrative embodiment. As depicted, joint assembly 400 is an example of a physical implementation of joint assembly 202 shown in block form in FIG. 2. Specifically, FIG. 5 is a view of a portion of joint assembly 400 from side 436 of FIG. 4.

Joint assembly 400 has plurality of fasteners 502. Plurality of fasteners 502 may be plurality of fasteners 222 of FIG. 2. As depicted, plurality of fasteners 502 includes several sizes of fasteners. Plurality of fasteners 502 includes fasteners 504, fasteners 506, fasteners 508, fasteners 510, and fasteners 512. Fasteners 504 connect first primary structure 404 to first plate 410 of FIG. 4. Fasteners 504 may be referred to as single shear fasteners. A fastener in single shear has load applied in one plane. For fasteners 504, load is applied in a plane between first plate 410 and first elongated structure 402, both of FIG. 4.

Fasteners 506 connect first primary structure 404 to second plate 412. As depicted, fasteners 506 are larger in diameter than fasteners 504. Fasteners 506 may be larger in diameter than fasteners 504 as loads increase closer to second structural member 418. Further, fasteners 506 may be larger in diameter than fasteners 504 to gradually relieve load from first elongated structure 402.

A portion of fasteners 506 also connect first primary structure 404 to first plate 410 and first elongated structure 402. Specifically, fastener 522, fastener 524, fastener 526, and fastener 528 connect second plate 412, first primary structure 404, first elongated structure 402, and first plate 410. Thus first primary structure 404 and first elongated structure 402 are clamped between two metallic plates, first plate 410 and second plate 412. This clamping provides support to first primary structure 404 and first elongated structure 402. This clamping also reduces out of plane loads.

Fastener 522, fastener 524, fastener 526, and fastener 528 may be referred to as double shear fasteners. A fastener in double shear has load applied in two planes. For fastener 522, fastener 524, fastener 526, and fastener 528, load is applied in a plane between first plate 410 and first elongated structure 402, and in a plane along second plate 412 and first primary structure 404.

Fastener 530 and fastener 532 connect first primary structure 404 to second plate 412. Fastener 530 and fastener 532 may be referred to as single shear fasteners. For fastener 530 and fastener 532, load is applied in a plane between first primary structure 404 and second plate 412.

Fasteners 508 connect second plate 412 to second structural member 418 and first structural member 416. Specifically, second plate 412 is held between second structural member 418 and first structural member 416 by fasteners 508.

Fasteners 510 connect second primary structure 408 to second plate 412. A portion of fasteners 510 also connect second primary structure 408 to third plate 414 and second elongated structure 406. Specifically, fastener 514, fastener 516, fastener 518, and fastener 520 connect second plate 412, second primary structure 408, second elongated structure 406, and third plate 414. Thus, second primary structure 408 and second elongated structure 406 are clamped between two metallic plates, third plate 414 and second plate 412. Fastener 514, fastener 516, fastener 518, and fastener 520 may be referred to as double shear fasteners.

Fastener 534 and fastener 536 connect second primary structure 408 to second plate 412. Fastener 534 and fastener 536 may be referred to as single shear fasteners. For fastener 534 and fastener 536, load is applied in a plane between second primary structure 408 and second plate 412.

Fasteners 512 connect second primary structure 408 to third plate 414 of FIG. 4. Fasteners 512 may be referred to as single shear fasteners. As depicted, fasteners 510 are larger in diameter than fasteners 512.

Figure 6:
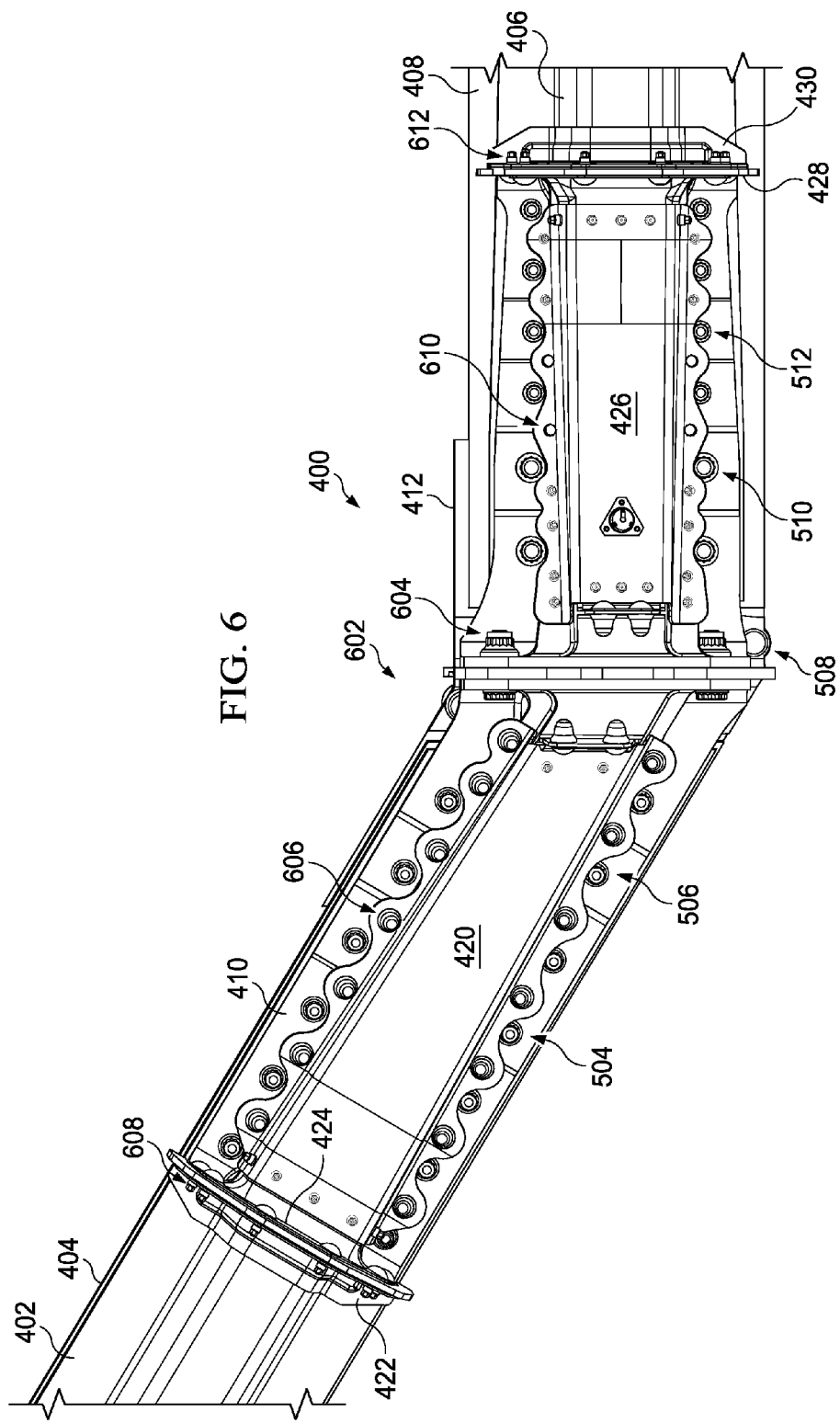
FIG. 6 is an illustration of a third view of a joint assembly in accordance with an illustrative embodiment.

Turning now to FIG. 6, an illustration of a third view of a joint assembly is depicted in accordance with an illustrative embodiment. As depicted joint assembly 400 is an example of a physical implementation of joint assembly 202 shown in block form in FIG. 2. Specifically, FIG. 6 is a view of joint assembly 400 from side 438 of FIG. 4.

Joint assembly 400 has plurality of fasteners 602. Plurality of fasteners 602 includes plurality of fasteners 502 from FIG. 5. Plurality of fasteners 602 has fasteners 504, fasteners 506, fasteners 508, fasteners 510, fasteners 512, fasteners 604, fasteners 606, fasteners 608, fasteners 610, and fasteners 612.

Fasteners 604 connect first plate 410 and third plate 414 to first structural member 416. First structural member 416 may be a structural member selected from a rib, a chord, a stiffener, or any other suitable structural member. In one illustrative example, fasteners 604 may be referred to as through chord fasteners. In one illustrative example, first structural member 416 is a side of body rib chord.

In some illustrative examples, load may travel from first primary structure 404 and first elongated structure 402 towards joint assembly 400 and to first plate 410. First plate 410 may transfer a majority of the load to third plate 414. A portion of the load may be transferred into first structural member 416 at fasteners 604. The portion of the load transferred into first structural member 416 may be a component of load as a result of the angle change from first plate 410 to third plate 414 in joint assembly 400. As a result, at least one of the size, shape, material, or other suitable characteristics of fasteners 604 are selected to withstand the loads transferred between first plate 410, third plate 414, and first structural member 416.

Fasteners 606 connect cover assembly 420 to first plate 410. Fasteners 610 connect cover assembly 426 to third plate 414. Fasteners 608 connect cover assembly 420, seal dam 422, and adapter plate 424, and first plate 410. Fasteners 612 connect cover assembly 426, adapter plate 428, seal dam 430, and second plate 412.

Fasteners 606 and fasteners 610 do not transfer loads from first elongated structure 402 or second elongated structure 406. Accordingly, fasteners 606 and fasteners 610 may be configured to withstand lower forces than load carrying fasteners. In other words, fasteners 606 and fasteners 610 may be configured to withstand lower forces than at least one of fasteners 504, fasteners 506, fasteners 508, fasteners 510, fasteners 512, and fasteners 604. As a result, fasteners 606 and fasteners 610 may be smaller than or made from a different material than load carrying fasteners of joint assembly 400.

Figure 7:
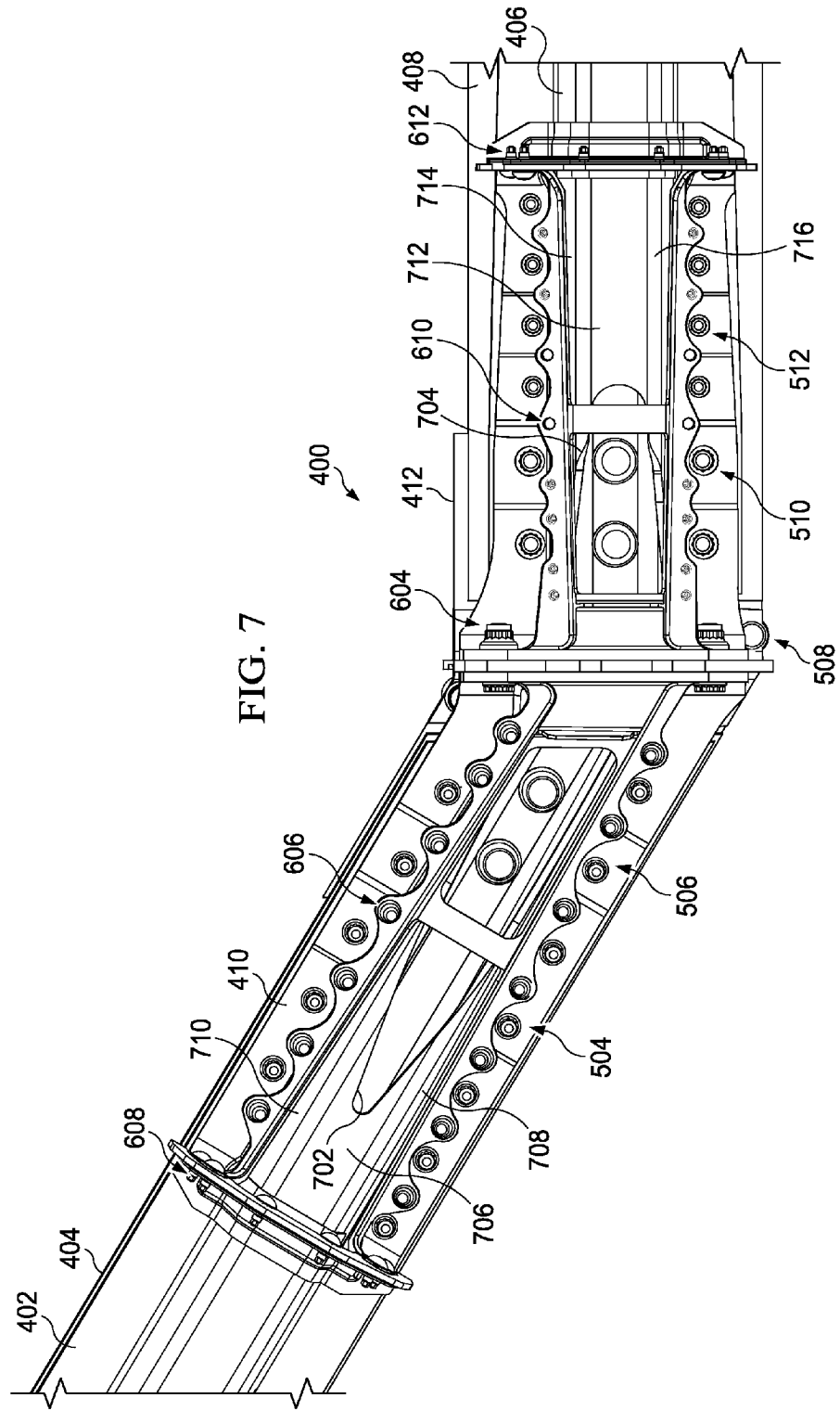
FIG. 7 is an illustration of a third view of a joint assembly with covers removed in accordance with an illustrative embodiment.

With reference now to FIG. 7, an illustration of a third view of a joint assembly with covers removed is depicted in accordance with an illustrative embodiment. As depicted, joint assembly 400 is an example of a physical implementation of joint assembly 202 shown in block form in FIG. 2. Specifically, FIG. 7 is a view of joint assembly 400 from side 438 of FIG. 4 with cover assembly 420 and cover assembly 426 removed.

As depicted, first elongated structure 402 has end trim 702. As depicted, second elongated structure 406 has end trim 704. End trim 702 and end trim 704 may allow for ease of construction of joint assembly 400. In one illustrative example, end trim 702 provides an opening for installation of fastener 530 and fastener 532 in FIG. 5. In this illustrative example, end trim 704 provides an opening for installation of fastener 534 and fastener 536 in FIG. 5.

In another illustrative example, end trim 702 and end trim 704 may also provide structural effects. In this illustrative example, end trim 702 may aid in transferring loads from first elongated structure 402. For example, end trim 702 may direct loads from cap 706 of first elongated structure 402 to end 708 and end 710 of first elongated structure 402. Fasteners 504 and fasteners 506 connect first plate 410 to first elongated structure 402 on end 708 and end 710 of first elongated structure 402. As a result, end trim 702 may help direct loads from first elongated structure 402 through fasteners 504 and fasteners 506 and into first plate 410.

Likewise, in another illustrative example, end trim 704 may aid in transferring loads from second elongated structure 406. End trim 704 may direct loads from cap 712 of second elongated structure 406 to end 714 and end 716 of second elongated structure 406. As a result, end trim 704 may help direct loads from second elongated structure 406 through fasteners 510 and fasteners 512 and into third plate 414.

In another illustrative example, end trim 702 may reduce interlaminar tension in first elongated structure 402. In this illustrative example, end trim 702 separates end 708 and end 710 near fasteners 604. End 708 and end 710 may tend to roll due to loads on first elongated structure 402. Without end trim 702, the rolling of end 708 would be joined with the rolling of end 710. This rolling may lead to high interlaminar tension in first elongated structure 402.

By having end trim 702, the rolling tendencies of end 708 and 710 may be decoupled. As a result, end trim 702 may further reduce out of plane loads on first elongated structure 402.

Although end trim 702 and end trim 704 are depicted as having different shapes, in some illustrative examples, end trim 702 and end trim 704 may have the same shape. Further, characteristics of end trim 702 and end trim 704 such as length, curvature, shape, and other suitable characteristics may be changed to meet structural, manufacturing, or other requirements.

Figure 8:
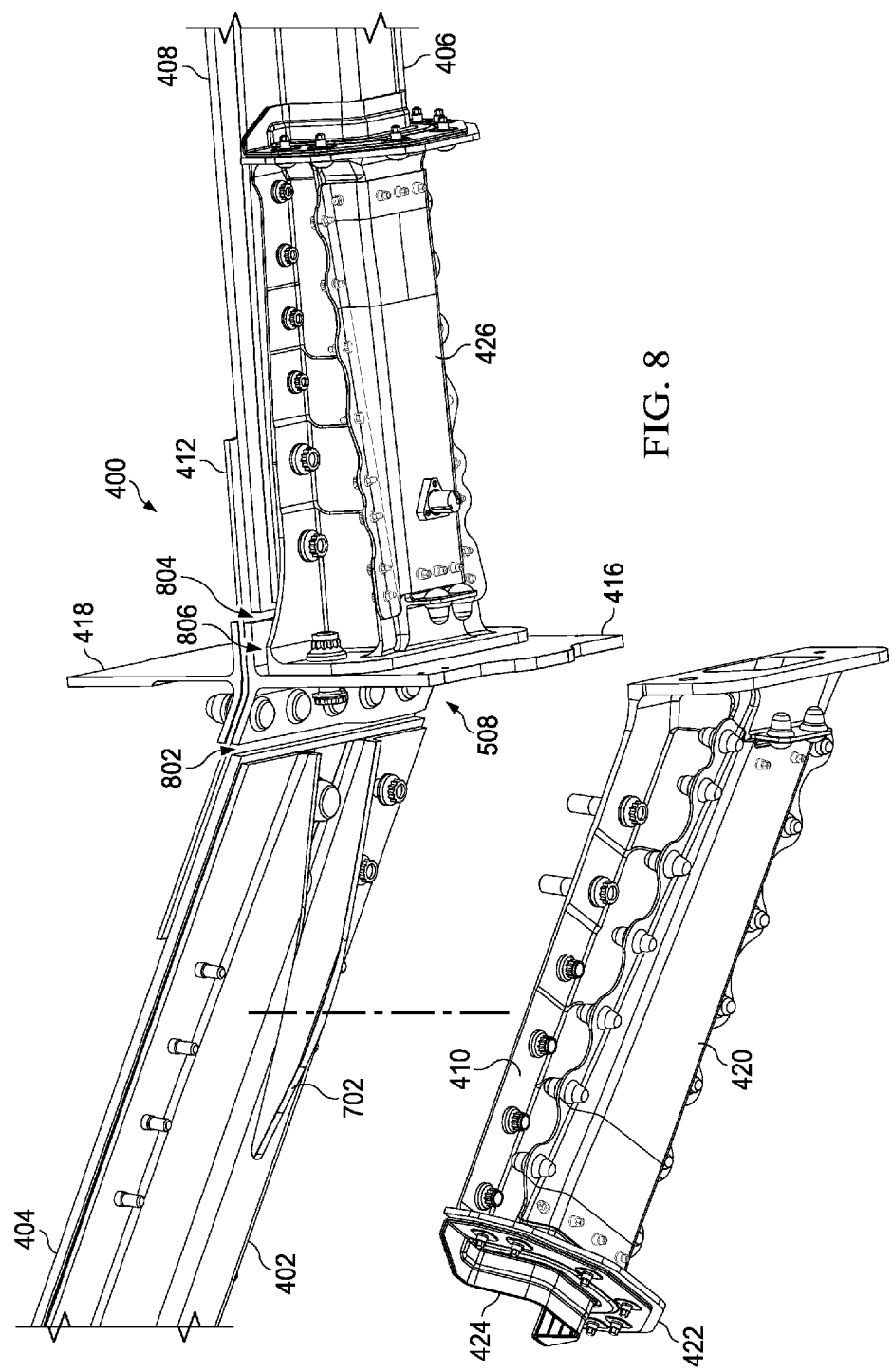
FIG. 8 is an illustration of a third view of a joint assembly with one half of the joint assembly exploded in accordance with an illustrative embodiment.

Turning now to FIG. 8, an illustration of a third view of a joint assembly with one half of the joint assembly exploded is depicted in accordance with an illustrative embodiment. As depicted, joint assembly 400 is an example of a physical implementation of joint assembly 202 shown in block form in FIG. 2. Specifically, FIG. 8 is a view of joint assembly 400 from side 438 of FIG. 4 with first plate 410, cover assembly 420, seal dam 422, and adapter plate 424 removed.

As depicted, first plate 410, cover assembly 420, seal dam 422, and adapter plate 424 are removed, exposing first elongated structure 402. First elongated structure 402 and first primary structure 404 do not contact first structural member 416 or second structural member 418. Gap 802 is present between first primary structure 404 and first structural member 416. Likewise second elongated structure 406 and second primary structure 408 do not contact first structural member 416 or second structural member 418. Gap 804 is present between second primary structure 408 and first structural member 416.

In this illustrative example, first plate 410 and third plate 414 are configured to accommodate fasteners 508. Specifically, first plate 410 is shaped to provide space between first structural member 416 and first plate 410 sufficient for fasteners 508. Likewise, third plate 414 is shaped to provide space between first structural member 416 and third plate 414 sufficient for fasteners 508. As depicted, gap 806 is present between first structural member 416 and third plate 414. Gap 806 provides sufficient clearance for fasteners 508. In some illustrative examples, gap 806 may be filled with a sealant.

Figure 9:
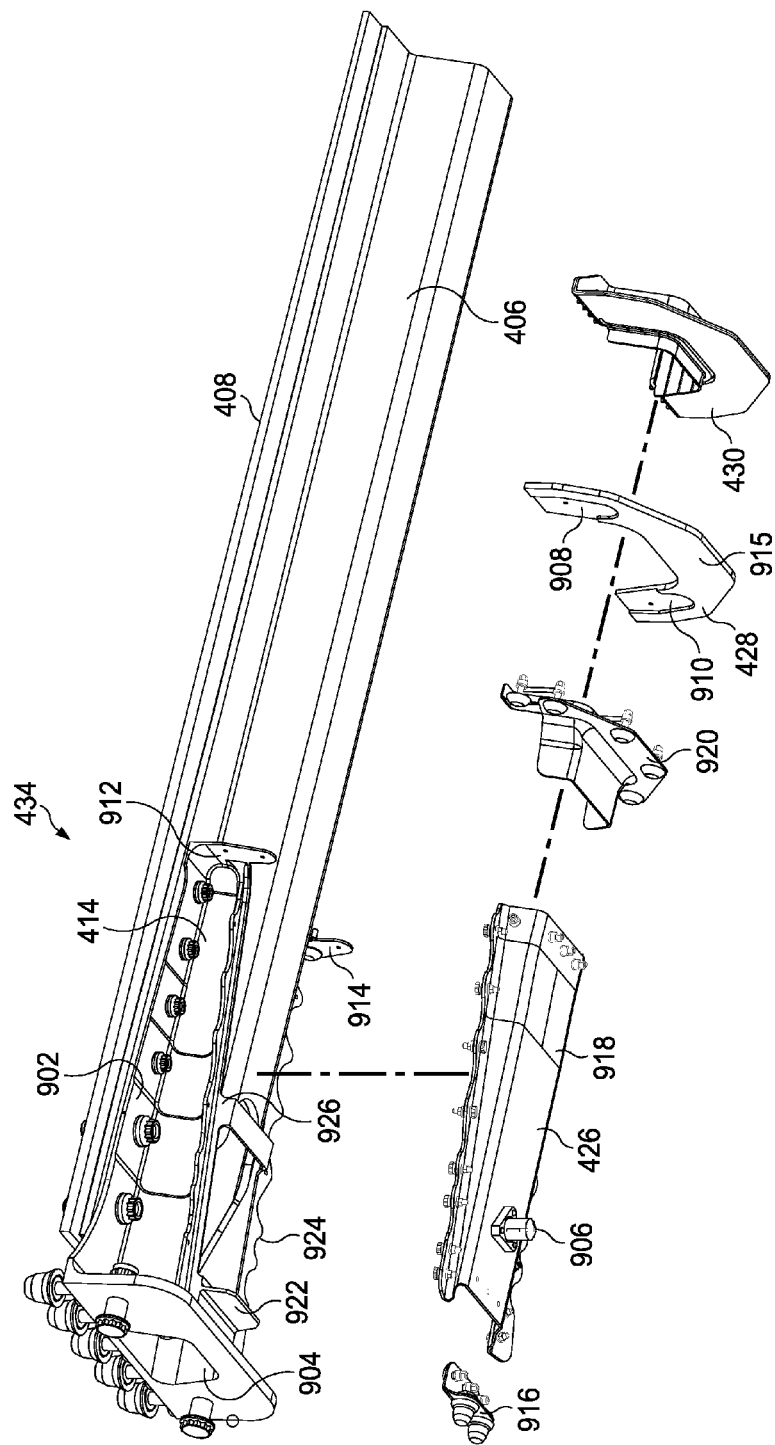
FIG. 9 is an illustration of an exploded first view of one half of a joint assembly in accordance with an illustrative embodiment.

With reference now to FIG. 9, an illustration of an exploded first view of one half of a joint assembly is depicted in accordance with an illustrative embodiment. As depicted, half 434 is an example of a physical implementation of half of joint assembly 202 shown in block form in FIG. 2, and a view of half 434 of joint assembly 400 of FIG. 4. Specifically, FIG. 9 is an exploded first view of half 434 of joint assembly 400 from approximately side 438 and direction 440 of FIG. 4.

As depicted, half 434 has third plate 414, cover assembly 426, seal dam 430 and adapter plate 428. Cover assembly 426, seal dam 430 and adapter plate 428 are removed. Cover assembly 426 is shown exploded into first piece 916, second piece 918, and third piece 920.

Third plate 414 is connected to second elongated structure 406 and second primary structure 408. Third plate 414 has transition region 902 which gradually relieves load from second elongated structure 406 and second primary structure 408. Transition region 902 may gradually relieve load using at least one of its shape, thickness, material properties, height, or other suitable characteristics.

Third plate also has aperture 904. Fluid may flow in or out of aperture 904 during operation. Aperture 904 has a hydraulic diameter configured to meet a desired value. As shown, aperture 904 is the same size and shape as the space between second elongated structure 406 and second primary structure 408. However, in other illustrative examples, aperture 904 may be a different size or a different shape than the space between second elongated structure 406 and second primary structure 408.

Cover assembly 426 is configured to connect to third plate 414 to form a conduit for fluid. As depicted, in cover assembly 426, first piece 916 is configured to connect to flange 922 of third plate 414. Second piece 918 is configured to connect to flange 924 and flange 926 of third plate 414. Second piece 918 is also configured to connect to first piece 916 and third piece 920 of cover assembly 426. Third piece 920 is configured to connect to third plate 414, second piece 918 of cover assembly 426, seal dam 430 and adapter plate 428.

Cover assembly 426 has one way drain valve 906. As depicted, drain valve 906 is present within second piece 918 of cover assembly 426. In some illustrative examples, joint assembly 400 is part of an aircraft, such as aircraft 100 of FIG. 1. In these illustrative examples, drain valve 906 may be located at a low point of joint assembly 400 when the aircraft is at rest or in level flight.

It may be undesirable to have fuel within joint assembly 400 during operations of the aircraft, such as during flight. As a result, drain valve 906 may provide a path for accumulated liquid to escape from joint assembly 400. Drain valve 906 may be a one-way valve. In other words, drain valve 906 may allow fuel to exit joint assembly 400 through drain valve 906; however, drain valve 906 may not allow fuel to enter joint assembly 400 through drain valve 906. In some illustrative examples, when a liquid level outside second elongated structure 406 drops below a drain level, fuel may exit joint assembly 400 through drain valve 906.

Adapter plate 428 is configured to connect to and mate with third plate 414. Specifically, groove 908 and groove 910 of adapter plate 428 are configured to mate with flange 912 and flange 914 of third plate 414. In manufacturing half 434, sealant may be applied to face 915 of adapter plate 428, including groove 908 and groove 910. Sealant between adapter plate 428, third plate 414, and cover assembly 426 may form a substantially fluid tight seal between these components.

Figure 10:
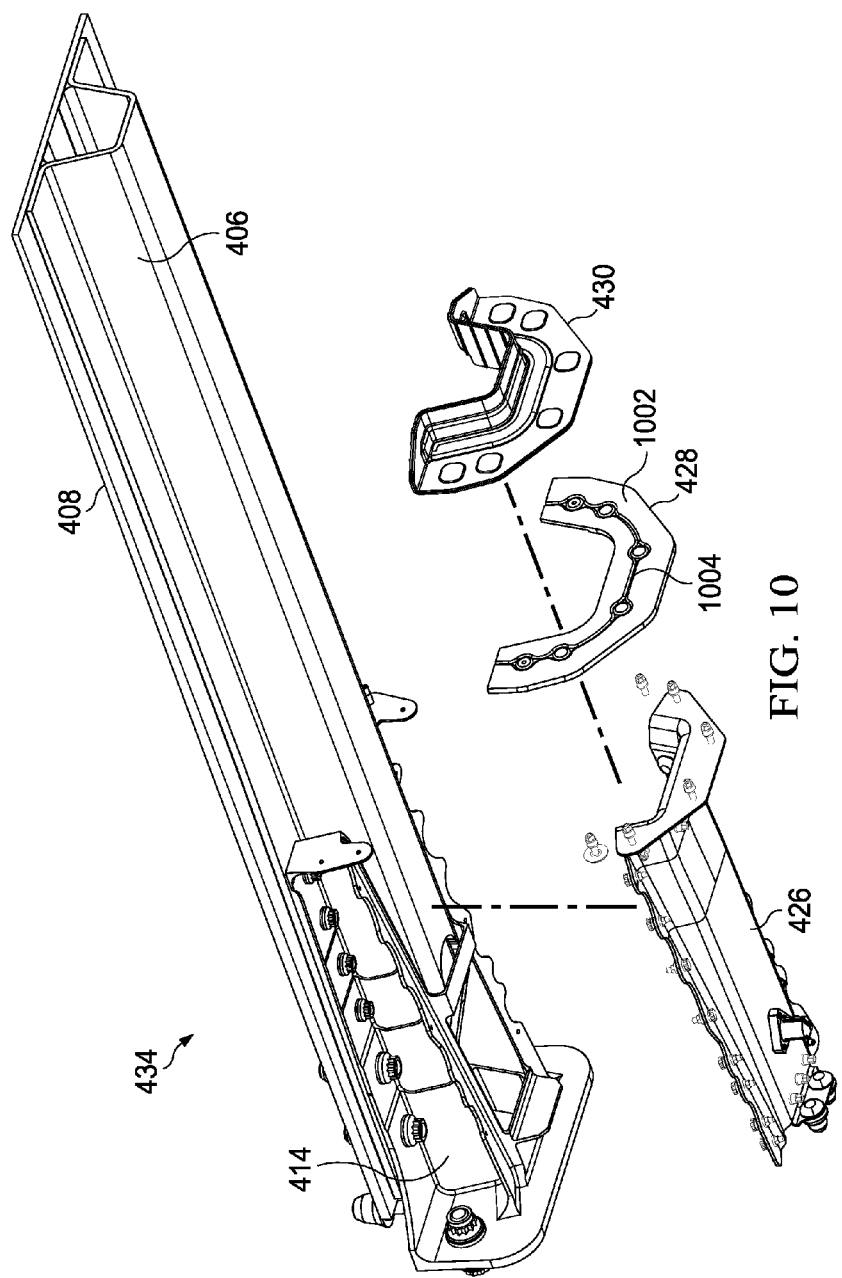
FIG. 10 is an illustration of an exploded second view of one half of a joint assembly in accordance with an illustrative embodiment.

With reference now to FIG. 10, an illustration of an exploded second view of one half of a joint is depicted in accordance with an illustrative embodiment. As depicted, half 434 is an example of a physical implementation of half of joint assembly 202 shown in block form in FIG. 2, and a view of half 434 of joint assembly 400 of FIG. 4. Specifically, FIG. 10 is an exploded second view of half 434 of joint assembly 400 from approximately side 438 and direction 442 of FIG. 4.

As depicted, half 434 has third plate 414, cover assembly 426, seal dam 430 and adapter plate 428. Cover assembly 426, seal dam 430 and adapter plate 428 are removed.

Face 1002 of adapter plate 428 has channel 1004. Channel 1004 is configured to receive sealant to form a seal between adapter plate 428 and seal dam 430. Seal dam 430 contacts second elongated structure 406 and creates a substantially fluid tight seal.

Figure 11:
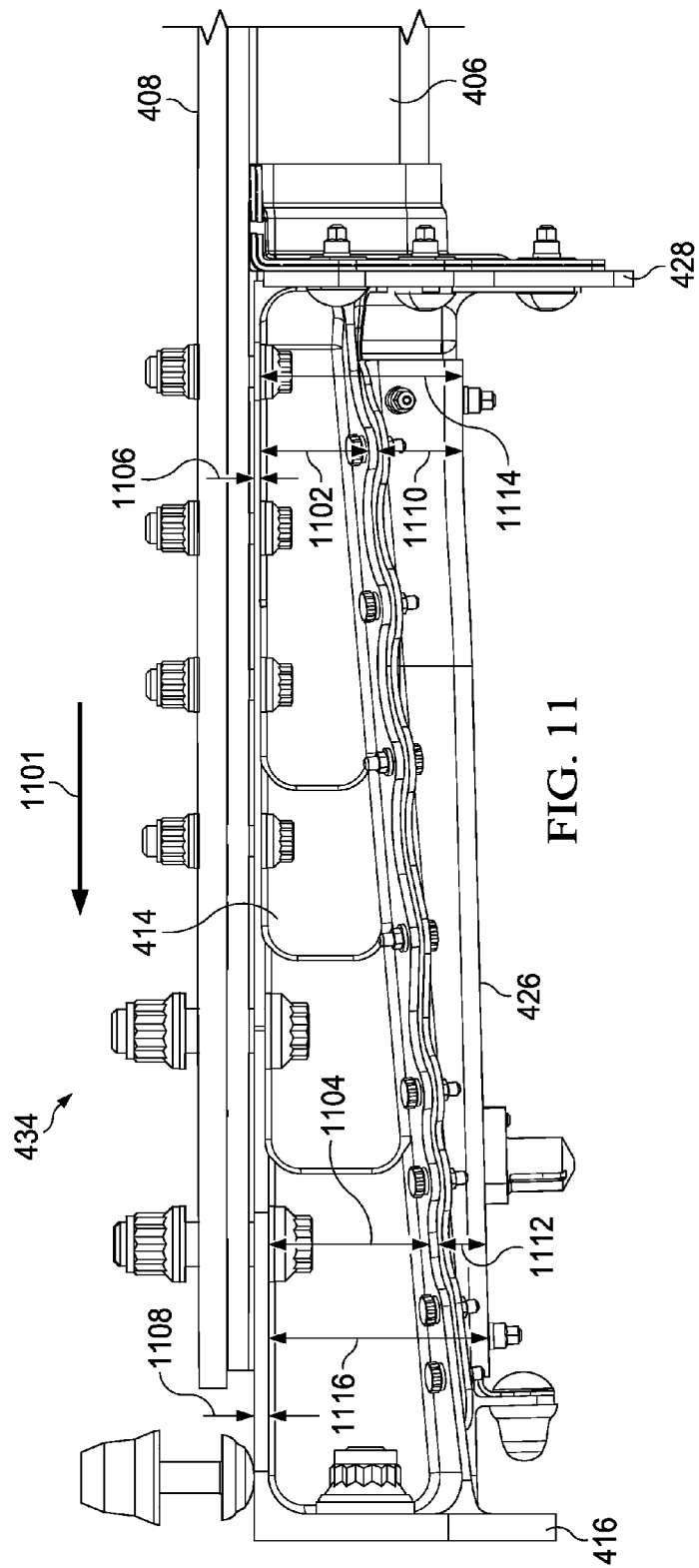
FIG. 11 is an illustration of a third view of one half of a joint assembly in accordance with an illustrative embodiment.

Turning now to FIG. 11, an illustration of a third view of one half of a joint assembly is depicted in accordance with an illustrative embodiment. As depicted, half 434 is an example of a physical implementation of half of joint assembly 202 shown in block form in FIG. 2, and a view of half 434 of joint assembly 400 of FIG. 4. Specifically, FIG. 11 is a third view of half 434 of joint assembly 400 from side 444 of FIG. 4.

As depicted, third plate 414 increases in height along second elongated structure 406. Specifically, third plate 414 increases in height in direction 1101 towards first structural member 416. As depicted, height 1102 of third plate 414 near adapter plate 428 is shorter than height 1104 of third plate 414 near first structural member 416.

As third plate 414 increases in height, third plate 414 also increases in thickness. Specifically, third plate 414 increases in thickness in direction 1101 towards first structural member 416. As depicted, thickness 1106 of third plate 414 near adapter plate 428 is thinner than thickness 1108 of third plate 414 near first structural member 416.

The change in thickness and in height of third plate 414 may influence the stiffness of third plate 414. As a result, thickness of third plate 414 and height of third plate 414 may influence the transfer of loads from second elongated structure 406 to third plate 414. In one illustrative example, the gradual change in thickness of third plate 414 gradually introduces load from second elongated structure 406 to third plate 414. Additionally, other characteristics of third plate 414 including the shape, size, material, or other suitable characteristics of third plate may be selected to result a desired stiffness.

In some illustrative examples, the gradual introduction of load transfer may reduce interlaminar tension in second elongated structure 406. In these illustrative examples, interlaminar tension may be reduced due to a reduction in overturning moment between third plate 414 and second elongated structure 406. As used herein, an overturning moment may be a mismatch in the elastic center of two objects. An overturning moment may cause a structure to turn over or to rotate out of the intended orientation.

Further, cover assembly 426 decreases in height in direction 1101. As depicted, height 1110 of cover assembly 426 near adapter plate 428 is greater than height 1112 of cover assembly 426 near first structural member 416.

Additionally, the overall height of cover assembly 426 and third plate 414 increases in direction 1101. Overall height 1114 near first structural member 416 is greater than overall height 1116 near adapter plate 428. Increasing overall height in direction 1101 may affect the functionality of joint assembly 400. In one illustrative example, overall height 1114 creates a desired hydraulic diameter near first structural member 416. The desired hydraulic diameter takes into account fastener 534 and fastener 536 extending into the flow path, as further shown in FIG. 14.

As described above, in some illustrative examples, cover assembly 426 may not be a significant contributor to joint load transfer. Accordingly, in these illustrative examples, cover assembly 426 or portions of cover assembly 426 may comprise a material which is less stiff than material of third plate 414.

Figure 12:
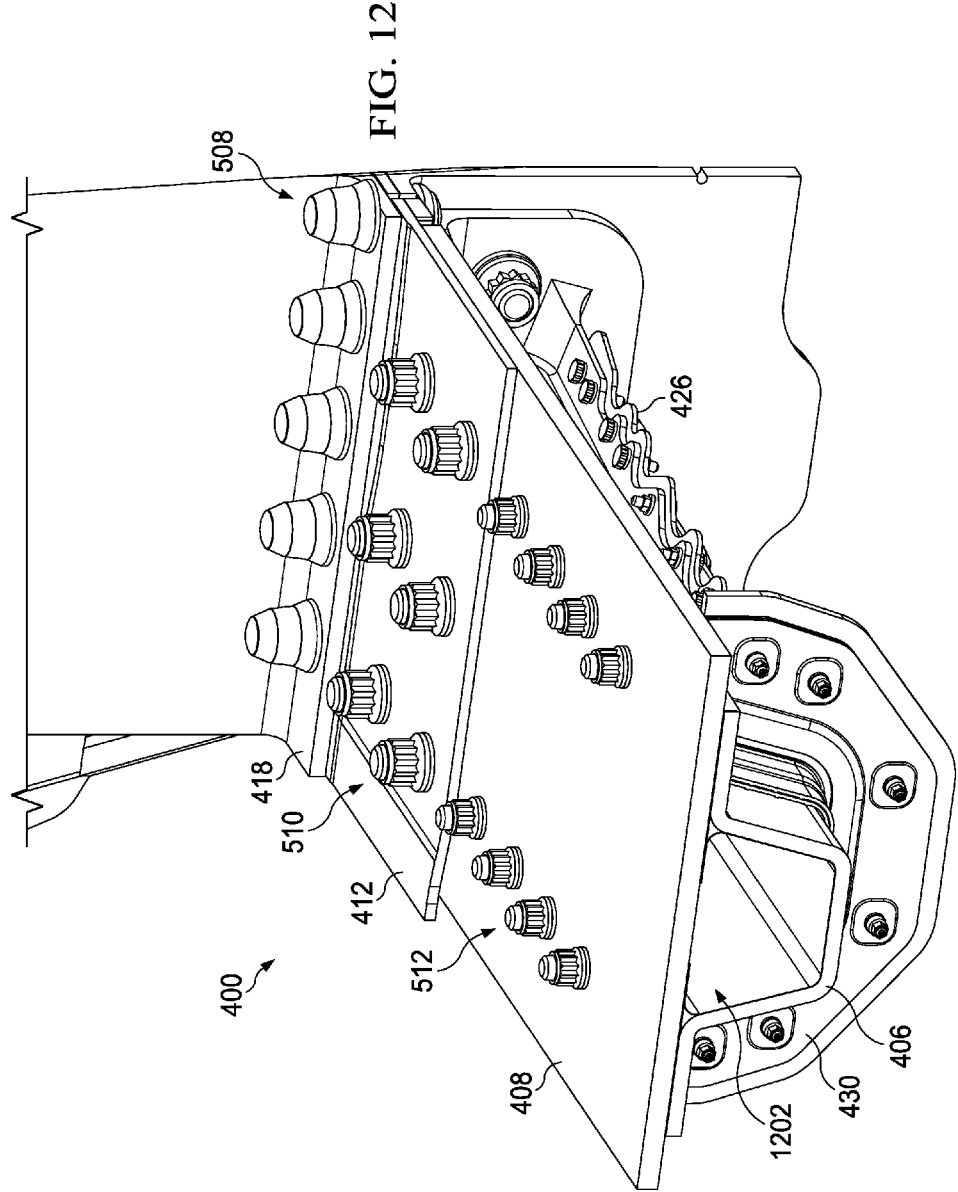
FIG. 12 is an illustration of a cross-section of a joint assembly in accordance with an illustrative embodiment.

With reference now to FIG. 12, an illustration of a cross-section of a joint assembly is depicted in accordance with an illustrative embodiment. As depicted, joint assembly 400 is an example of a physical implementation of joint assembly 202 shown in block form in FIG. 2, and a cross-sectional view of joint assembly 400 of FIG. 4.

FIG. 12 is a cross-sectional view through second elongated structure 406 and second primary structure 408 prior to seal dam 430. Specifically, FIG. 12 is a cross-sectional view of joint assembly 400 along lines 12-12 of FIG. 4. As shown in FIG. 12, second elongated structure 406 and second primary structure 408 form a conduit through which fluid may flow prior to reaching seal dam 430. Cross-section 1202 is the hydraulic section of the conduit prior to reaching seal dam 430.

Figure 13:
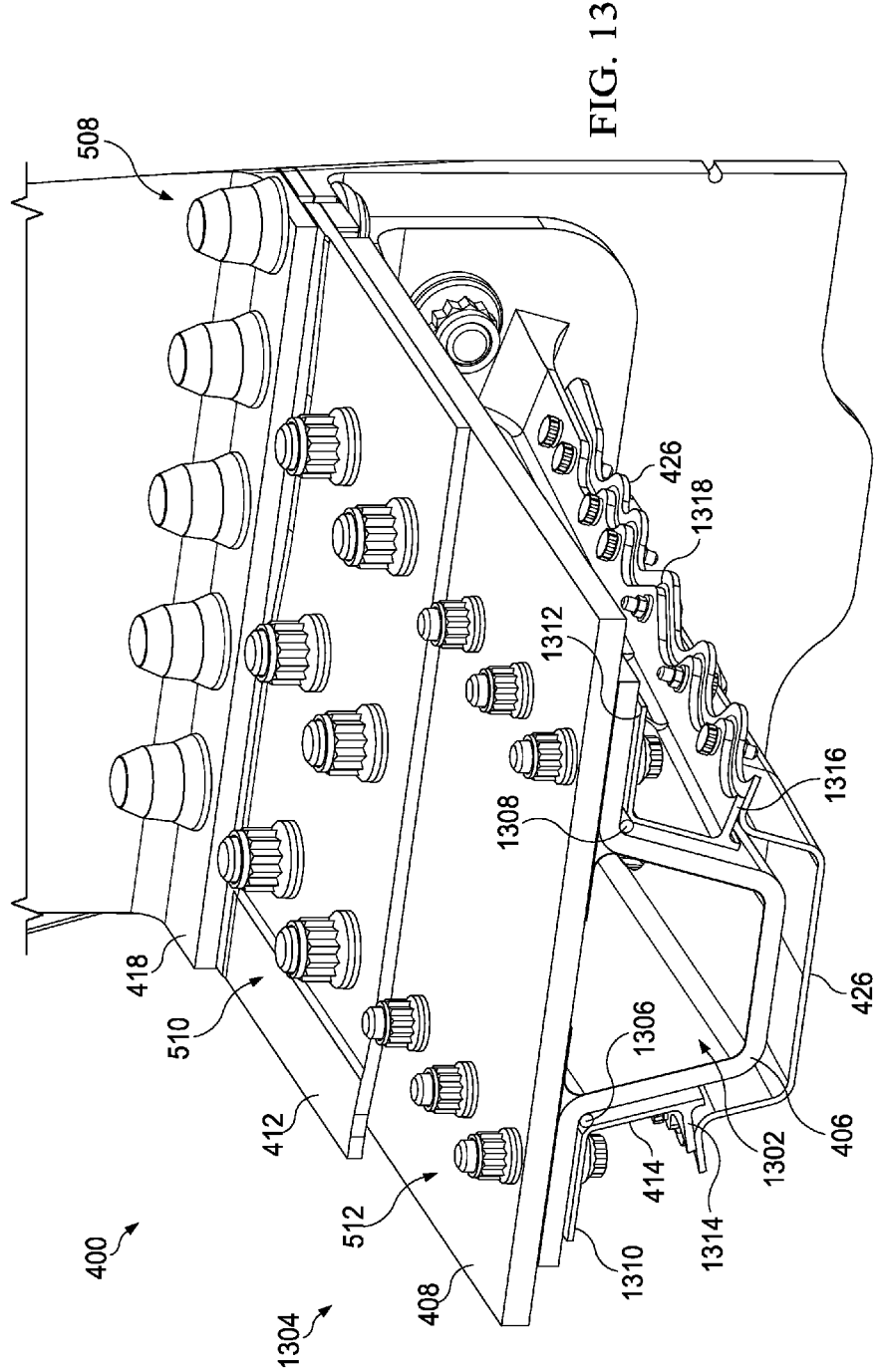
FIG. 13 is an illustration of a cross-section of a joint assembly in accordance with an illustrative embodiment.

With reference now to FIG. 13, an illustration of a cross-section of a joint assembly is depicted in accordance with an illustrative embodiment. As depicted, joint assembly 400 is an example of a physical implementation of joint assembly 202 shown in block form in FIG. 2. FIG. 13 is a cross-sectional view through the region of fasteners 512. Specifically, FIG. 13 is a cross-sectional view of joint assembly 400 along lines 13-13 of FIG. 4.

As shown in FIG. 13, second elongated structure 406 and second primary structure 408 form a conduit through which fluid may flow. Cross-section 1302 is the hydraulic section of the conduit in this section of joint assembly 400.

Third plate 414 and cover assembly 426 are connected to second elongated structure 406 and second primary structure 408. Third plate 414 and cover assembly 426 cover second elongated structure 406 in this section of joint assembly 400.

Fluid may also be located between second elongated structure 406 and at least one of third plate 414 and cover assembly 426. As a result, plurality of seals 1304 is present within joint assembly 400. Plurality of seals 1304 may be plurality of seals 232 of FIG. 2. Plurality of seals 1304 may include at least one of fillet seals and fay seals. As depicted, plurality of seals 1304 includes fillet seal 1306, fillet seal 1308, fay seal 1310, fay seal 1312, fay seal 1314, fay seal 1316, and fillet seal 1318.

As depicted, third plate 414 allows visual inspection of fillet seal 1306 and fillet seal 1308 with cover assembly 426 removed. Further, in one illustrative example, third plate 414 allows installation of fillet seal 1306 and fillet seal 1308 with cover assembly 426 removed. At least one of the size or shape of third plate 414 are configured such that fillet seal 1306 and fillet seal 1308 may be visually inspected with cover assembly 426 removed. Further, at least one of the size or shape of cover assembly 426 are configured such that fillet seal 1306 and fillet seal 1308 may be visually inspected with cover assembly 426 removed.

Figure 14:
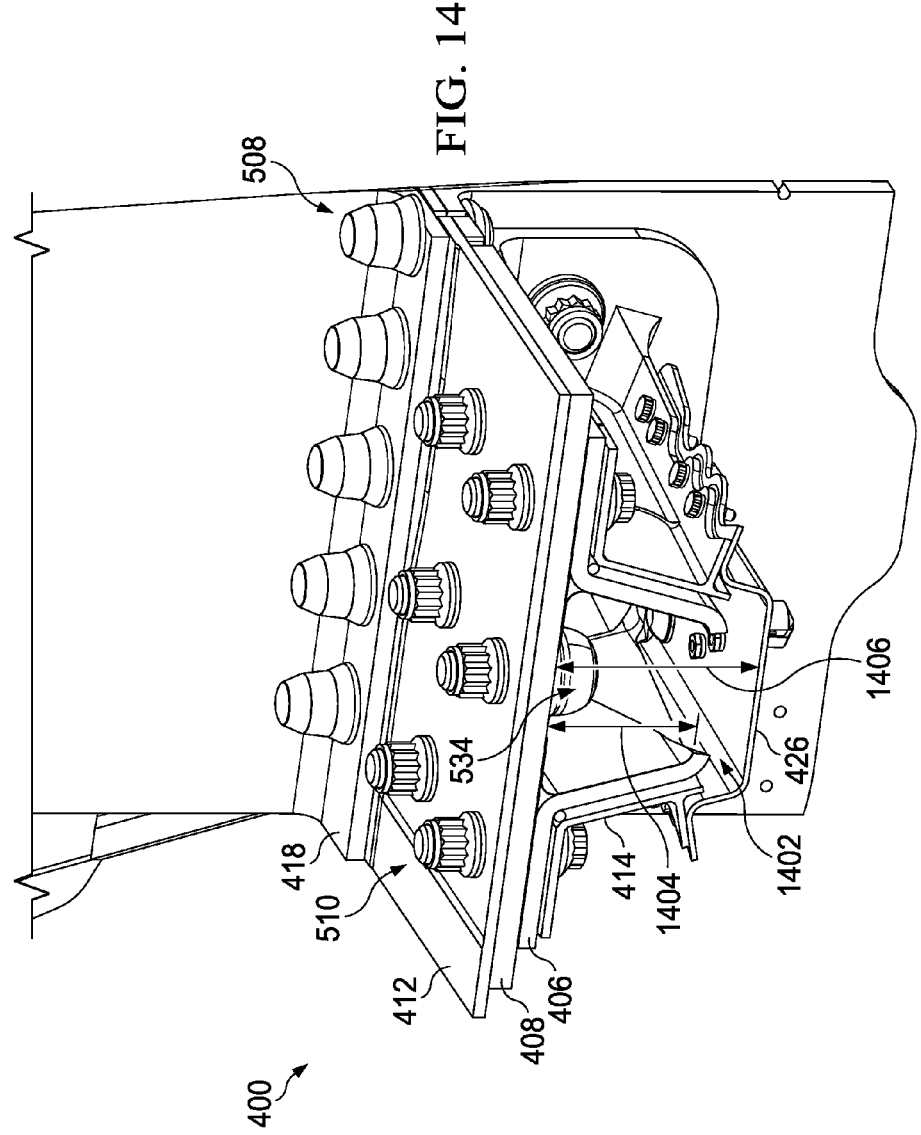
FIG. 14 is an illustration of a cross-section of a joint assembly in accordance with an illustrative embodiment.

With reference to FIG. 14, an illustration of a cross-section of a joint assembly is depicted in accordance with an illustrative embodiment. As depicted, joint assembly 400 is an example of a physical implementation of joint assembly 202 shown in block form in FIG. 2. FIG. 14 is a cross-sectional view of joint assembly 400 through the region of fasteners 510. Specifically, FIG. 14 is a cross-sectional view of joint assembly 400 along lines 14-14 of FIG. 4.

As shown in FIG. 14, second elongated structure 406 has end trim 704. As a result of end trim 704, second elongated structure 406, second primary structure 408, third plate 414, and cover assembly 426 form a conduit through which fluid may flow. Cross-section 1402 is the hydraulic section of the conduit in this section of joint assembly 400.

Height 1404 of second elongated structure 406 is less than overall height 1406 of cover assembly 426 and third plate 414. Overall height 1406 provides a hydraulic diameter configured to meet a desired value. In this illustrative example, overall height 1406 is greater than height 1404 of second elongated structure 406 to compensate for fastener 534 blocking portions of the flow path.

Figure 15:
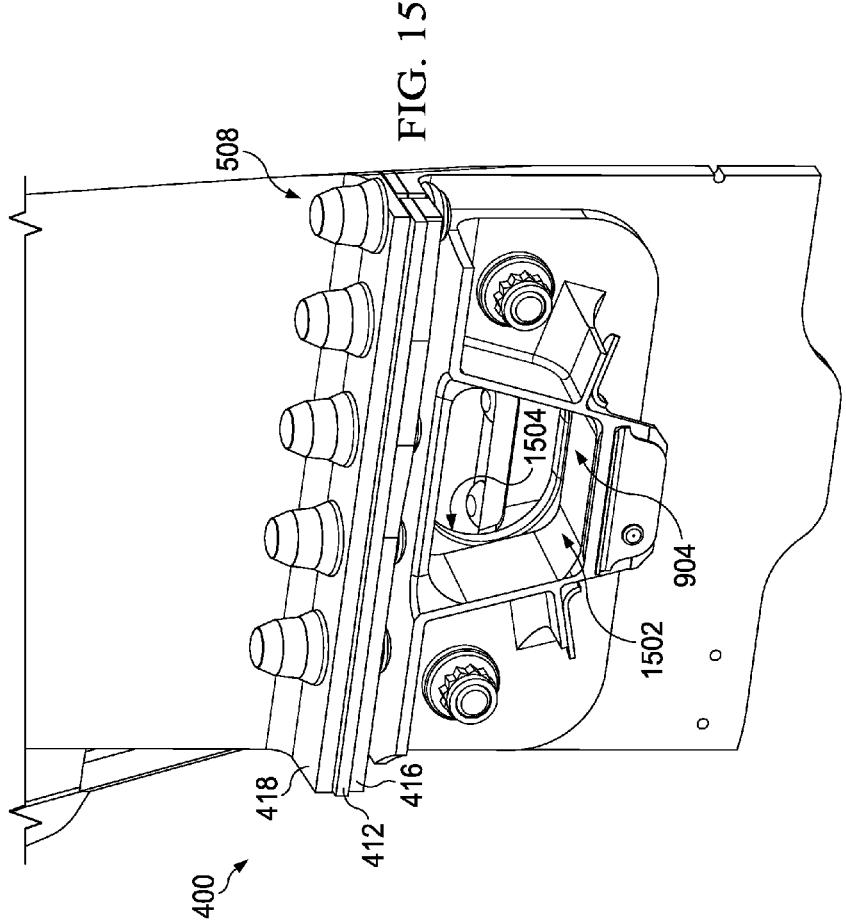
FIG. 15 is an illustration of a cross-section of a joint assembly in accordance with an illustrative embodiment.

With reference to FIG. 15, an illustration of a cross-section of a joint assembly is depicted in accordance with an illustrative embodiment. As depicted joint assembly 400 is an example of a physical implementation of joint assembly 202 shown in block form in FIG. 2. FIG. 15 is a cross-sectional view of joint assembly 400 through the region of fasteners 508. Specifically, FIG. 15 is a cross-sectional view of joint assembly 400 along lines 15-15 of FIG. 4.

As depicted in FIG. 15, aperture 904 of third plate 414 forms a conduit through which fluid may flow. Cross-section 1502 is the hydraulic section of the conduit in this section of joint assembly 400. As depicted, the fluid path continues through aperture 904 of third plate 414, through opening 1504 of first structural member 416 and into first plate 410.

The different components shown in FIG. 1 and FIGS. 3-15 may be combined with components in FIG. 2, used with components in FIG. 2, or a combination of the two. Additionally, some of the components in FIG. 1 and FIGS. 3-15 may be illustrative examples of how components shown in block form in FIG. 2 can be implemented as physical structures.

Figure 16:
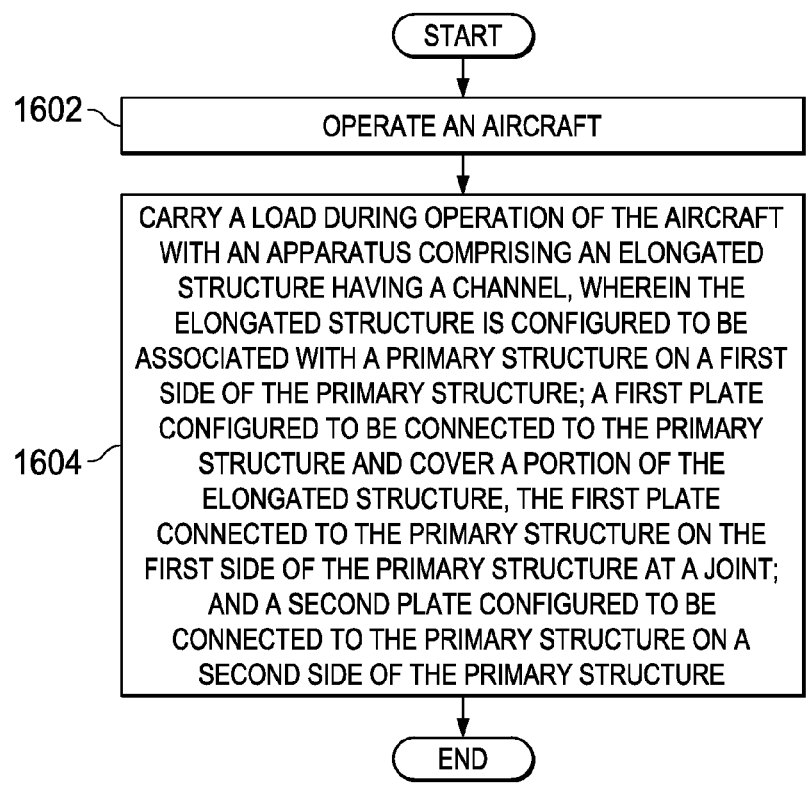
FIG. 16 is an illustration of a flowchart of a process for operation in accordance with an illustrative embodiment.

Turning now to FIG. 16, a flowchart of a process for operation is depicted in accordance with an illustrative embodiment. In this illustrative example, process 1600 in FIG. 16 may be implemented in platform 200 using joint assembly 202 in FIG. 2.

The process begins by operating an aircraft (operation 1602). Next, a load is carried during operation of the aircraft (operation 1604). The load is carried with an apparatus comprising an elongated structure, a primary structure, a first plate, and a second plate. The elongated structure having a channel. The elongated structure is configured to be associated with a primary structure on a first side of the primary structure. The first plate is configured to be connected to the primary structure and cover a portion of the elongate composite. The first plate is connected to the primary structure on the first side of the primary structure at a joint. The second plate is configured to be connected to the primary structure on a second side of the primary structure.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, a fueling operation may occur prior to operation 1602 or following operation 1604. The fueling operation is carried out with a fuel vent system comprising the apparatus.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in the form of a block diagram in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in the form of a block diagram in which an illustrative embodiment may be implemented. In this example, aircraft 1800 is produced by aircraft manufacturing and service method 1700 in FIG. 17 and may include airframe 1802 with systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. One or more illustrative embodiments may be used during component and subassembly manufacturing 1706. For example, joint assembly 202 in FIG. 2 may be used during component and subassembly manufacturing 1706. Further, joint assembly 202 may also be used to perform replacements during maintenance and service 1714. For example, aircraft 1800 may be inspected, including inspection of fillet seals 234 by removing cover assembly 244 and cover assembly 262 during scheduled maintenance for aircraft 1800.

The illustrative embodiments may provide a method and apparatus for forming structural joints between elongated structures to form sealed flow conduits. In particular, the illustrative embodiments may provide a joint assembly to connect two elongated structures comprising composite material to form a fuel vent. In the illustrative embodiments, the joint assembly provides desired structural integrity while providing a sealed flow conduit.

Further, the illustrative embodiments may reduce out of plane loads in the elongated structures comprising composite material. Shape and varying thickness of plates may gradually transfer loads from the elongated structures and primary structures to a joint assembly. Additionally, clamping the elongated structures and primary structures between two metallic plates near the highest loads may reduce out of plane loads in the elongated structures.

One or more illustrative embodiments may provide elongated structures with end trim to transfer load within the elongated structures. Further one or more illustrative embodiments provide for a joint assembly in which a fillet seal may be installed and visually inspected with a first plate connected to a first elongated structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft comprising: an elongated structure,
   comprising a channel,
   the elongated structure being connected to a primary structure on a first side of the primary structure;
   a first plate that connects to the primary structure at a joint, such that the first plate covers a portion of the elongated structure,
   and connects to the primary structure on the first side of the primary structure,
   the first side being a surface of the primary structure that faces a cover connected to the first plate;
   and a second plate connected to the primary structure on a second side of the primary structure,
   the second side being a surface of the primary structure that faces away from the cover.

2. The aircraft of claim 1 further comprising:
   the first plate and the second plate carrying a desired load for the joint;
   and the second plate being connected to the elongated structure and to the first plate.

3. The aircraft of claim 1, wherein a thickness of the first plate tapers along a length of the elongated structure.

4. The aircraft of claim 1, wherein the first plate gradually transfers a load along a length of the elongated structure;
   and connects to the elongated structure and a first structural member.

5. The aircraft of claim 1, wherein the elongated structure comprises a composite stringer,
   and wherein the composite stringer has an end trim within a cap of the composite stringer,
   and wherein the end trim performs at least one of:
   transferring load within the composite stringer,
   and reducing interlaminar tension in the composite stringer.

6. The aircraft of claim 1, wherein the first plate is associated with the elongated structure using a plurality of fasteners,
   and wherein corresponding sizes of the plurality of fasteners increase along a length of the elongated structure.

7. The aircraft of claim 1, wherein a height of the first plate tapers along a length of the elongated structure.

8. The aircraft of claim 1 further comprising:
a sealing assembly associated with a first end of the first plate,
the sealing assembly comprising:
a seal dam;
an adapter plate;
and a plurality of seals.

9. The aircraft of claim 8, wherein at least one of: the first plate, and the cover assembly allow visual inspection of a fillet seal between the elongated structure and the first plate when the cover is removed.

10. The aircraft of claim 8, wherein the primary structure and the elongated structure comprise composite material,
and a fastener that connects the first plate to the primary structure and the elongated structure,
said fastener also connects the elongated structure to the first side.

11. An apparatus comprising:
a first elongated structure comprising a first channel, the first elongated structure being connected to a first primary structure;
a second elongated structure comprising a second channel, the second elongated structure associated with a second primary structure; and
a joint assembly joining the first elongated structure and the second elongated structure, the joint assembly comprising:
a first plate connected to a first side of the first primary structure, the first plate covering a portion of the first elongated structure, the first side of the first primary structure being a surface of the first primary structure that faces a cover connected to the first plate;
a second plate associated with the first primary structure, and the second primary structure, the second plate being connected to a second side of the first primary structure and a first side of the second primary structure, the second side of the first primary structure being a surface of the first primary structure that faces away from the cover connected to the first plate; and
a third plate connected to a second side of the second primary structure, the third plate covering a portion of the second elongated structure, the first side of the second primary structure being a surface of the second primary structure that faces away from a cover connected to a third plate, and the second side of the second primary structure being a surface of the second primary structure that faces the cover connected to the third plate; such that the first plate and the third plate associate with a first structural member, and the second plate associates with a second structural member.

12. The apparatus of claim 11, wherein the first elongated structure is associated with a wing of an aircraft, and wherein the second elongated structure is associated with a center wing box of the aircraft.

13. The apparatus of claim 11, wherein the first elongated structure, the first primary structure, the second elongated structure, the second primary structure, and the joint assembly to create a sealed flow conduit.

14. The apparatus of claim 13, wherein the joint assembly comprises a desired hydraulic diameter for the sealed flow conduit.

15. The apparatus of claim 13, wherein the sealed flow conduit comprises a fuel vent.

16. The apparatus of claim 11, wherein the first elongated structure, the second elongated structure, the first primary structure, and the second primary structure comprise composite material,
and a fastener that connects the first plate to the first primary structure and the first elongated structure,
said fastener also connects the elongated structure to the first side.

17. A method comprising:
operating an aircraft; and
carrying a load during operation of the aircraft via an apparatus comprising an elongated structure comprising a first channel, the elongated structure being associated with a primary structure on a first side of the primary structure, the first side being a surface of the primary structure that faces a cover connected to a first plate, such that the first plate connects to:
the primary structure and covers a portion of the elongated structure; and
the primary structure on the first side of the primary structure at a joint; and
a second plate; such that the second plate connects to the primary structure on a second side of the primary structure, the second side being a surface of the primary structure that faces away from the cover connected to the first plate.

18. The method of claim 17, wherein the apparatus further comprises:
a second elongated structure comprising a second channel, the second elongated structure associated with a second primary structure, wherein the second plate connects to the second primary structure; and
a third plate connected to the second primary structure and cover a portion of the second elongated structure.

19. The method of claim 18, further comprising:
flowing fuel through the first channel and the second channel of the apparatus.

20. The method of claim 17, wherein the primary structure and the elongated structure comprise composite material,
and a fastener that connects the first plate to the primary structure and the elongated structure,
said fastener also connects the elongated structure to the first side.

* * * * *